United States Patent
Jin et al.

(10) Patent No.: US 12,543,124 B2
(45) Date of Patent: Feb. 3, 2026

(54) METHOD AND APPARATUS FOR SUPPORTING POWER HEADROOM REPORT FOR MULTIPLE TRANSMISSION RECEPTION POINTS IN NEXT GENERATION MOBILE COMMUNICATION SYSTEM

(71) Applicant: Samsung Electronics Co., Ltd., Gyeonggi-do (KR)

(72) Inventors: Seungri Jin, Gyeonggi-do (KR); Anil Agiwal, Gyeonggi-do (KR); Jaehyuk Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 825 days.

(21) Appl. No.: 17/875,902

(22) Filed: Jul. 28, 2022

(65) Prior Publication Data

US 2023/0042752 A1    Feb. 9, 2023

(30) Foreign Application Priority Data

Jul. 29, 2021    (KR) .......................... 10-2021-0099718

(51) Int. Cl.
*H04W 52/36*    (2009.01)
*H04W 52/08*    (2009.01)
(Continued)

(52) U.S. Cl.
CPC ................................ *H04W 52/365* (2013.01)

(58) Field of Classification Search
None
See application file for complete search history.

(56) References Cited

U.S. PATENT DOCUMENTS 11,553,443 B2 *    1/2023    Hosseini ................ H04L 5/001
12,238,652 B2 *    2/2025    Gong .................. H04W 52/242
(Continued)

FOREIGN PATENT DOCUMENTS

| WO | WO 2018/205257 | 11/2018 |
|---|---|---|
| WO | WO 2020/063560 | 4/2020 |
| WO | WO 2021/022513 | 2/2021 |

OTHER PUBLICATIONS

InterDigital, Inc., "Multi-TRP Enhancements for PUCCH and PUSCH", R1-2104293, 3GPP TSG RAN WG1 #105-e, May 10-27, 2021, 5 pages.
(Continued)

*Primary Examiner* — Pablo N Tran
(74) *Attorney, Agent, or Firm* — The Farrell Law Firm, P.C.

(57) ABSTRACT

The disclosure relates to a 5G or 6G communication system for supporting a higher data transmission rate. A method performed by a terminal is provided, the method including receiving, from a base station, a radio resource control (RRC) message including information associated with a power headroom report (PHR) of multiple transmission and reception points (TRPs), in case that a PHR is triggered, obtaining a first power headroom (PH) of a first TRP and a second PH of a second TRP, generating a medium access control (MAC) control element (CE) for the multiple TRPs including the first PH of the first TRP and the second PH of the second TRP, and transmitting, to the base station, the MAC CE for the multiple TRPs.

16 Claims, 16 Drawing Sheets

(51) Int. Cl.
  *H04W 52/14*    (2009.01)
  *H04W 72/21*    (2023.01)

(56) References Cited

U.S. PATENT DOCUMENTS

| | | | |
|---|---|---|---|
| 12,323,344 B2* | 6/2025 | Khoshnevisan | H04W 76/15 |
| 12,363,648 B2* | 7/2025 | Zhang | H04W 52/146 |
| 2019/0053170 A1 | 2/2019 | Lee et al. | |
| 2020/0186304 A1 | 6/2020 | Khoshnevisan et al. | |
| 2021/0045070 A1 | 2/2021 | Yi et al. | |
| 2023/0362835 A1* | 11/2023 | Lee | H04W 52/367 |
| 2024/0155510 A1* | 5/2024 | Sridharan | H04W 52/365 |
| 2024/0259959 A1* | 8/2024 | Yi | H04W 52/365 |
| 2024/0422698 A1* | 12/2024 | Hu | H04W 52/146 |
| 2025/0048279 A1* | 2/2025 | Cirik | H04W 52/365 |
| 2025/0261124 A1* | 8/2025 | Yuan | H04W 72/231 |
| 2025/0267675 A1* | 8/2025 | Sun | H04W 72/0453 |
| 2025/0280370 A1* | 9/2025 | Yuan | H04W 72/21 |

OTHER PUBLICATIONS

International Search Report dated Oct. 25, 2022 issued in counterpart application No. PCT/KR2022/011096, 7 pages.
European Search Report dated Sep. 27, 2024 issued in counterpart application No. 22849893.7-1206, 9 pages.

* cited by examiner

FIG. 10D

Enhanced Multiple Entry PHR MAC CE format
Option 1 (10120) – variant

| $C_7$ | $C_6$ | $C_5$ | $C_4$ | $C_3$ | $C_2$ | $C_1$ | T |
|---|---|---|---|---|---|---|---|

(10125)

| P | V | PH (Type 2, SpCell of the other MAC entity) |
|---|---|---|
| MPE or R | | $P_{CMAX,f,c}$ 1 |
| P | V | PH (Type 1, PCell) |
| MPE or R | | $P_{CMAX,f,c}$ 2 |
| P | V | PH (Type X, Serving Cell 1) |
| MPE or R | | $P_{CMAX,f,c}$ 3 |

. . .

| P | V | PH (Type X, Serving Cell n) |
|---|---|---|
| MPE or R | | $P_{CMAX,f,c}$ m |

| $C_7$ | $C_6$ | $C_5$ | $C_4$ | $C_3$ | $C_2$ | $C_1$ | T |
|---|---|---|---|---|---|---|---|

(10130)

| P | V | PH (Type 2, SpCell of the other MAC entity) |
|---|---|---|
| MPE or R | | $P_{CMAX,f,c}$ 1 |
| P | V | PH (Type 1, PCell) |
| MPE or R | | $P_{CMAX,f,c}$ 2 |
| P | V | PH (Type X, Serving Cell 1) |
| MPE or R | | $P_{CMAX,f,c}$ 3 |

. . .

| P | V | PH (Type X, Serving Cell n) |
|---|---|---|
| MPE or R | | $P_{CMAX,f,c}$ m |

METHOD AND APPARATUS FOR SUPPORTING POWER HEADROOM REPORT FOR MULTIPLE TRANSMISSION RECEPTION POINTS IN NEXT GENERATION MOBILE COMMUNICATION SYSTEM

CROSS-REFERENCE TO RELATED APPLICATION(S)

This application is based on and claims priority under 35 U.S.C. § 119 to Korean Patent Application No. 10-2021-0099718, filed in the Korean Intellectual Property Office on Jul. 29, 2021, the entire disclosure of which is incorporated herein by reference.

BACKGROUND

1. Field

The disclosure relates to user equipment (UE) and base station (BS) operations in a mobile communication system, and, more particularly, relates to a method and an apparatus for a power headroom report (PHR) in a mobile communication system.

2. Description of Related Art 5G mobile communication technologies define broad frequency bands such that high transmission rates and new services are possible, and can be implemented not only in sub 6 GHz bands such as 3.5 GHz, but also in above 6 GHz bands referred to as mmWave including 28 GHz and 39 GHz. In addition, it has been considered to implement 6G mobile communication technologies (referred to as beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broad band (eMBB), ultra reliable low latency communications (URLLC), and massive machine-type communications (mMTC), there has been ongoing standardization regarding beamforming and massive multiple input multiple output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of a bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random access procedure for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will connect to communication networks, and it is accordingly expected that enhanced functions and performances of 5G mobile communication systems and integrated operations of connected devices will be necessary. To this end, new research is scheduled in connection with eXtended reality (XR) for efficiently supporting augmented reality (AR), virtual reality (VR), mixed reality (MR) and the like, 5G performance improvement and complexity reduction by utilizing artificial intelligence (AI) and machine learning machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure, which has been made to address at least the above-mentioned problems and/or disadvantages and to provide at least the advantages described below, provides a method for using a PHR in a wireless communication system.

Further, the disclosure provides a wireless communication system, and in particular, to a method for a UE to notify a BS of a PHR for each transmission reception point (TRP) in case that a plurality of TRPs exist.

According to an aspect of the disclosure, a method performed by a terminal in a wireless system, is provided, the method including receiving, from a BS, a radio resource control (RRC) message including information associated with a PHR of multiple TRPs, in case that a PHR is triggered, obtaining a first power headroom (PH) of a first TRP and a second PH of a second TRP, generating a medium access control (MAC) control element (CE) for the multiple TRPs, and transmitting, to the BS, the MAC CE for the multiple TRPs.

According to another aspect of the disclosure, a method performed by a BS is provided, the method including transmitting, to a terminal, an RRC message including information associated with a PHR of multiple TRPs, receiving, from the terminal, a MAC CE for the multiple TRPs including a first PH of a first TRP and a second PH of a second TRP, and obtaining the first PH of the first TRP and the second PH of the second TRP based on the MAC CE for the multiple TRPs.

According to a further aspect of the disclosure, a terminal is provided that includes a transceiver and a controller operably coupled with the transceiver, with the controller being configured to receive, from a BS, an RRC message including information associated with a PHR of multiple TRPs, in case that a PHR is triggered, to obtain a first PH of a first TRP and a second PH of a second TRP, to generate a MAC CE for the multiple TRPs, and to transmit, to the BS, the MAC CE for the multiple TRPs.

According to another aspect of the disclosure, a BS is provided that includes a transceiver and a controller operably coupled with the transceiver, with the controller being configured to transmit, to a terminal, an RRC message including information associated with a PHR of multiple TRPs, to receive, from the terminal, a MAC CE for the multiple TRPs including a first PH of a first TRP and a second PH of a second TRP, and to obtain the first PH of the first TRP and the second PH of the second TRP based on the MAC CE for the multiple TRPs.

Embodiments of the disclosure provide improved UE and BS operations in a wireless communication system, provide a method and an apparatus for a PHR in a wireless communication system, provide a UE that performs a method for transferring a PHR for each TRP in a state where a plurality of TRPs are configured, and provide a BS that performs a method for performing scheduling in accordance with a UE transmission power for each TRP.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 10A, 10B, 10C, and 10D illustrate the structure and feature of a PHR MAC CE for a plurality of TRPs, which is applied to embodiments, in various methods;

DETAILED DESCRIPTION

Figure 1:
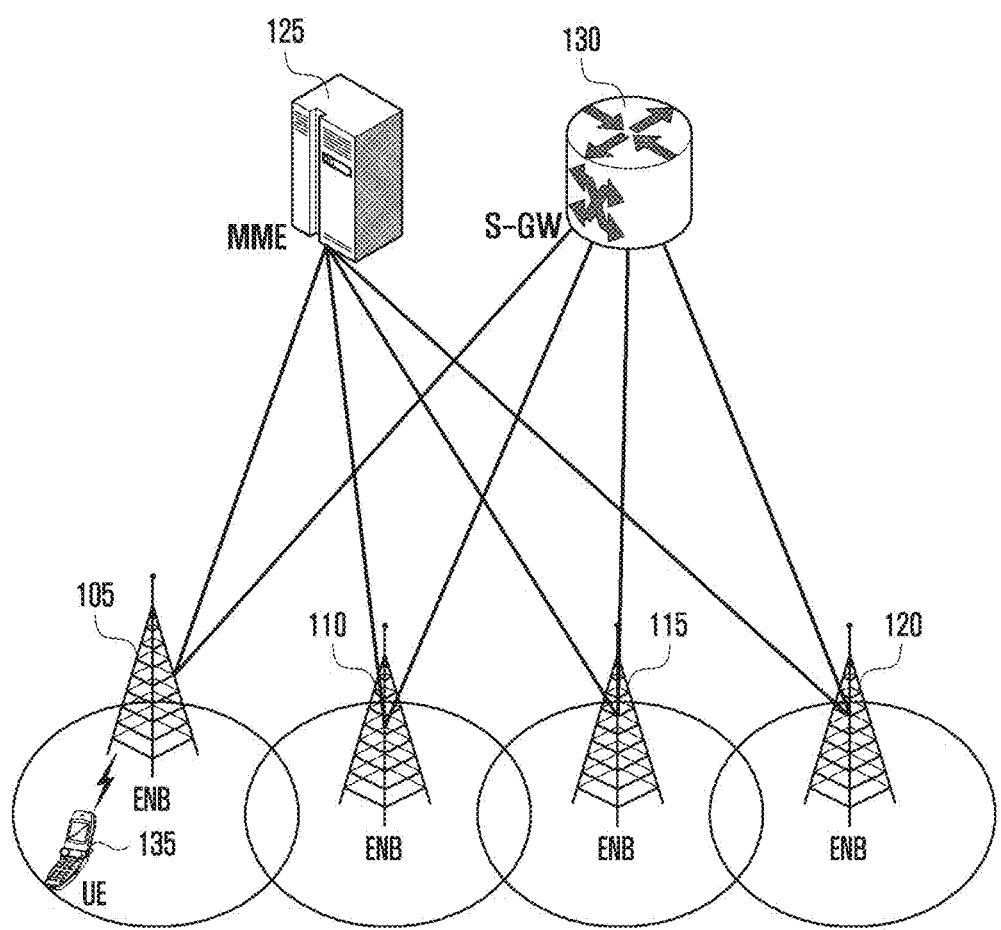
FIG. 1 illustrates a structure of a long term evolution (LTE) system.

Hereinafter, embodiments of the disclosure will be described in detail with reference to the accompanying drawings. In this case, it is to be noted that in the accompanying drawings, the same constituent elements are denoted by the same reference numerals. Further, detailed explanation of known functions and configurations that may obscure the subject matter of the disclosure will be omitted.

In describing the embodiments in the description, explanation of technical contents that are well known in the technical field to which the disclosure pertains and are not directly related to the disclosure will be omitted. This is to describe the subject matter of the disclosure more clearly without obscuring the same through omission of unnecessary explanations.

For the same reason, in the accompanying drawings, some constituent elements may be exaggerated, omitted, or briefly illustrated. Further, sizes of the respective constituent elements do not completely reflect the actual sizes thereof, and in the drawings, the same reference numerals may be used for the same or corresponding constituent elements across various figures.

The advantages and features of the disclosure and methods will be apparent by referring to the embodiments to be described in detail with reference to the accompanying drawings. However, the disclosure is not limited to the embodiments disclosed hereinafter, and it can be implemented in diverse forms. The matters defined in the embodiments of the disclosure are only specific details provided to assist those of ordinary skill in the art in a comprehensive understanding of the disclosure, and the disclosure is only defined within the scope of the appended claims. The same reference numerals are used for the same constituent elements.

In this case, it will be understood that each block of the flowchart illustrations, and combinations of blocks in the flowchart illustrations, can be performed by computer program instructions. These computer program instructions can be provided to a processor of a general purpose computer, special purpose computer, or other programmable data processing apparatus, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instructions to implement the function specified in the flowchart block or blocks. The computer program instructions may also be loaded onto a computer or other programmable data processing apparatus to cause a series of operational steps to be performed on the computer or other programmable data processing apparatus to produce a computer implemented process such that the instructions that execute on the computer or other programmable data processing apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term unit refers to a software or hardware component, such as a field programmable gate array (FPGA) or an application specific integrated circuit (ASIC), which performs certain tasks. However, unit is not meant to be limited to software or hardware. The unit may advantageously be configured to reside on the addressable storage medium and configured to execute on one or more processors. Thus, unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units, or further separated into additional components and units. Further, the components and units may be implemented to operate one or more central processing units (CPUs) in a device or a security multimedia card.

Hereinafter, a BS is the subject that performs resource allocation of a UE, and may be at least one of a Node B, a BS, an eNode B (eNB), a gNode B (gNB), a radio access unit, a BS controller, or a node on a network. A UE may include a mobile station (MS), a cellular phone, a smart phone, a computer, or a multimedia system that can perform a communication function. Further, an embodiment of the disclosure may be applied even to other communication systems having technical backgrounds or channel types similar to those of the embodiment of the disclosure. Further, an embodiment of the disclosure may be applied to other communication systems through some modifications in a range that does not greatly deviate from the scope of the disclosure by the judgment of those skilled in the art. For example, the fifth generation mobile communication technology (5G, new radio, or NR) having been developed after long term evolution-advanced (LTE_A) may be included in such other communication systems, and the following 5G may be the concept that includes existing LTE, LTE-A, and other similar services. Further, the disclosure may be applied to other communication systems through some modifications in a range that does not greatly deviate from the scope of the disclosure by the judgment of those skilled in the art.

In the following description, a term to identify an access node, a term to denote network entities or network functions (NFs), a term to denote messages, a term to denote an interface between network entities, and a term to denote a variety of identity information have been exemplified for convenience in explanation. Accordingly, the disclosure is not limited to the following terms, and other terms to denote targets having equivalent technical meanings may be used.

Hereinafter, for convenience in explanation, some terms and names defined in the 3rd generation partnership project (3GPP) LTE standards and/or 3GPP NR standards may be used. However, the disclosure is not restricted by the terms and names, and it may be equally applied to systems complying with other standards.

FIG. 1 illustrates a structure of an LTE system.

With reference to FIG. 1, as illustrated, a radio access network of an LTE system is composed of evolved node Bs (hereinafter referred to as "eNBs", "node Bs", or "base stations") 105, 110, 115, and 120, a mobility management entity (MME) 125, and a serving-gateway (S-GW) 130. User equipment (hereinafter referred to as "UE" or "terminal") 135 accesses an external network through the eNBs 105, 110, 115, and 120 and the S-GW 130.

In FIG. 1, the eNBs 105, 110, 115, and 120 correspond to existing node Bs of a universal mobile telecommunications system (UMTS) system. The eNB 105 is connected to the UE 135 on a radio channel, and plays a more complicated role than that of the existing node B. In the LTE system, since all user traffic including a real-time service, such as a voice over IP (VoIP) through an Internet protocol, are serviced on shared channels, entities performing scheduling through gathering of state information, such as a buffer state, an available transmission power state, and a channel state of UEs, are necessary, and the eNBs 105, 110, 115, and 120 take charge of this. In general, one eNB controls a plurality of cells. For example, in order to implement a transmission speed of 100 Mbps, the LTE system uses, for example, orthogonal frequency division multiplexing (OFDM) as a radio access technology (RAT) in a bandwidth of 20 MHz. Further, the LTE system adopts an adaptive modulation & coding (AMC) scheme that determines a modulation scheme and a channel coding rate to match the channel state of the UE 135. The S-GW 130 is an entity that provides a data bearer, and generates or removes the data bearer under the control of the MME 125. The MME 125 is an entity that takes charge of not only a mobility management function for the UE 135 but also various kinds of control functions, and is connected to the plurality of BSs 105, 110, 115, and 120.

Figure 2:
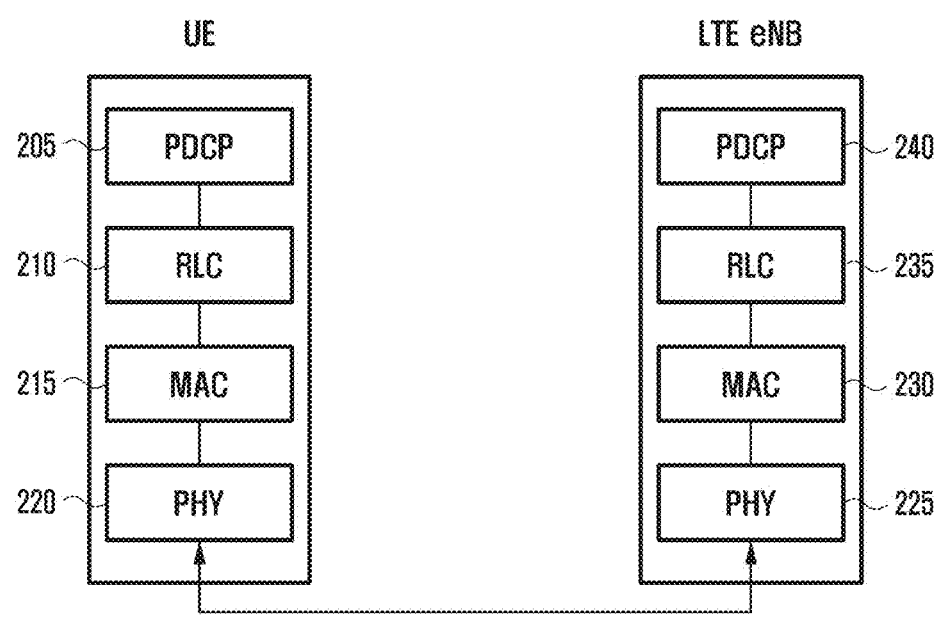
FIG. 2 illustrates a radio protocol structure of an LTE system.

FIG. 2 illustrates a radio protocol structure of an LTE system.

With reference to FIG. 2, in a UE or an eNB, a radio protocol of an LTE system is composed of a packet data convergence protocol (PDCP) 205 or 240, a radio link control (RLC) 210 or 235, a MAC 215 or 230, and a PHY 220 or 225.

The PDCP 205 or 240 takes charge of IP header compression/decompression operations. The main functions of the PDCP 205 or 240 are summarized as follows.

Header compression and decompression: robust header compression (ROHC) only

Transfer of user data

In-sequence delivery of upper layer PDUs at PDCP re-establishment procedure for RLC AM For split bearers in DC (only support for RLC AM):
  PDCP PDU routing for transmission and PDCP PDU reordering for reception
Duplicate detection of lower layer service data units (SDUs) at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in UL RLC 210 or 235 performs an ARQ operation by reconfiguring a PDCP packet data unit (PDCP PDU) with a suitable size. Main functions of the RLC 210 or MAC 215 are summarized as follows.

Transfer of upper layer PDUs
Error correction through automatic repeat request (ARQ) (only for acknowledgement mode (AM) data transfer)
Concatenation, segmentation and reassembly of RLC SDUs (only for unacknowledged mode (UM) and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC 215 or 230 is connected to several RLC layer devices configured in one entity, and performs multiplexing of RLC PDUs into the MAC PDU and demultiplexing of RLC PDUs from the MAC PDU. The main functions of the MAC 215 or 230 are summarized as follows.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by dynamic scheduling
MBMS service identification
Transport format selection
Padding The physical layer (PHY) 220 or 225 performs channel coding and modulation of upper layer data, and makes and transmits OFDM symbols on a radio channel, or performs demodulation and channel decoding of the OFDM symbols received on the radio channel and transfers the OFDM symbols to an upper layer. Further, for additional error connection, a physical layer also uses hybrid ARQ (HARQ), and a receiving end transmits whether a packet transmitted by a transmitting end is received by one bit. This is called HARQ ACK/NACK information. Downlink (DL) HARQ ACK/NACK information for UL transmission is transmitted on a physical hybrid-ARQ indicator channel (PHICH), and UL HARQ ACK/NACK information for DL transmission may be transmitted on a physical UL control channel (PUCCH) or a PUSCH.

Meanwhile, the PHY layer may be composed of one or a plurality of frequencies/carriers, and a technology that simultaneously configures and uses a plurality of frequencies is referred to as carrier aggregation (CA) technology. The CA technology can remarkably increase a transmission amount as many as the number of subcarriers by additionally using one main carrier and one or a plurality of subcarriers instead of using one carrier for communication between a UE and a BS. Meanwhile, in the LTE system, a cell in a BS that uses the main carrier is called a primary cell (PCell), and the subcarrier is called a secondary cell (SCell).

On an upper side of a PDCP layer of the UE and the BS, an RRC layer exists, and the RRC layer may send and receive a configuration control message related to an access and measurement for radio resource control.

Figure 3:
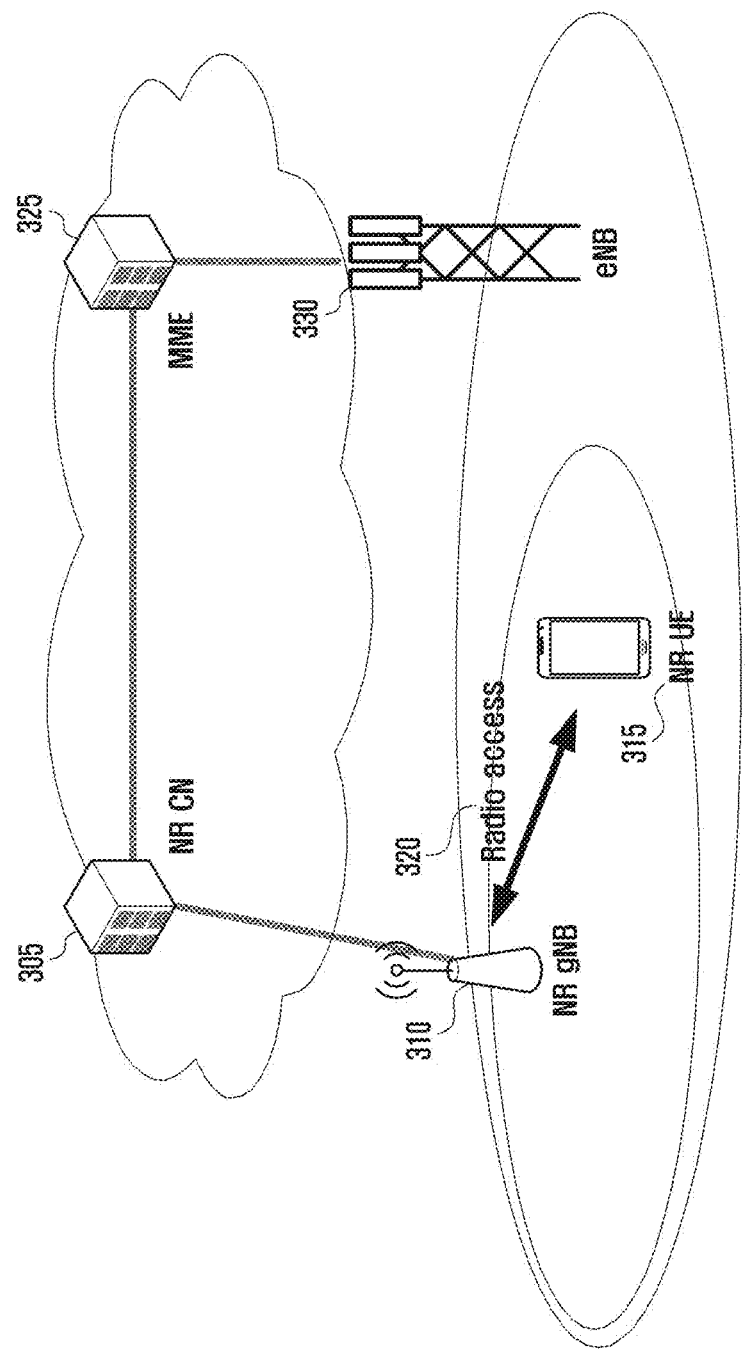
FIG. 3 illustrates a structure of a next generation mobile communication system.

FIG. 3 illustrates a structure of a next generation mobile communication system to which various embodiments are applied. With reference to FIG. 3, as illustrated, a radio access network of a next generation mobile communication system is composed of a new radio node B (NR NB) 310, and a new radio core network (NR CN) or a next generation core network (NG CN) 305. New radio user equipment (NR UE or UE) 315 accesses an external network through the NR NB 310 and the NR CN 305.

In FIG. 3, the NR NB 310 corresponds to an eNB of the existing LTE system. The NR NB 310 is connected to the NR UE 315 on a radio channel, and thus can provide a more superior service than the service of the existing Node B. In the next generation mobile communication system, all user traffic are serviced on shared channels, and thus there is a need for a device that performs scheduling through consolidation of state information, such as a buffer state of UEs, an available transmission power state, and a channel state, and the NR NB 310 takes charge of this. In general, one NR NB controls a plurality of cells. In order to implement ultrahighspeed data transmission as compared with the existing LTE system, a bandwidth that is greater than or equal to the existing maximum bandwidth may be applied, and a beamforming technology may be additionally grafted in consideration of the OFDM as a RAT. Further, the NR NB 310 adopts an AMC scheme that determines a modulation scheme and a channel coding rate to match the channel state of the UE. The NR CN 305 performs functions of mobility support, bearer setup, and quality of service (QoS) configuration. The NR CN 305 is a device that takes charge of not a mobility management function for the NR UE 315 but also various kinds of control functions, and is connected to a plurality of BSs. Further, the next generation mobile communication system may interlock with the existing LTE system, and the NR CN 305 is connected to an MME 325 through a network interface. The MME 325 is connected to the eNB 330 that is the existing BS.

Figure 4:
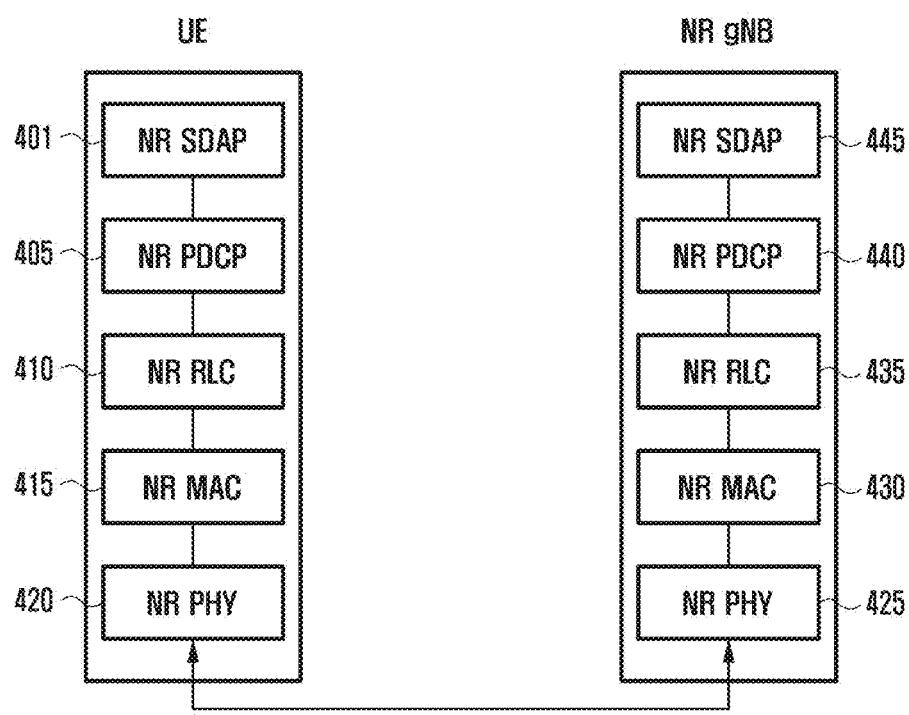
FIG. 4 illustrates a radio protocol structure of a next generation mobile communication system.

FIG. 4 illustrates a radio protocol structure of a next generation mobile communication system to which various embodiments are applied.

With reference to FIG. 4, in the UE or NR BS, a radio protocol of the next generation mobile communication system includes an NR SDAP 401 or 445, an NR PDCP 405 or 440, an NR RLC 410 or 435, an NR MAC 415 or 430, and an NR PHY 420 or 425.

The main functions of the NR SDAP 401 or 445 include some of the following functions.

Transfer of user plane data
Mapping between a QoS flow and a DRB for both DL and UL
Marking QoS flow ID in both DL and UL packets
Reflective QoS flow to DRB mapping for the UL SDAP PDUs With respect to the SDAP layer device, the UE may be configured whether to use a header of the SDAP layer device or whether to use the function of the SDAP layer device for each PDCP layer device, bearer, or logical channel through an RRC message. If the SDAP header is configured, the UE may indicate that the UE can update or reconfigure mapping information on the UL and DL QoS flow and the data bearer through a NAS QoS reflective configuration 1-bit indicator (NAS reflective QoS) of the SDAP header and an AS QoS reflective configuration 1-bit indicator (AS reflective QoS). The SDAP header may include QoS flow ID information indicating the QoS. The QoS information may be used as a data processing priority for supporting a smooth service, and for scheduling information.

The main functions of the NR PDCP 405 or 440 include some of the following functions.

Header compression and decompression: ROHC only
Transfer of user data
In-sequence delivery of higher layer PDUs
Out-of-sequence delivery of higher layer PDUs
PDCP PDU reordering for reception
Duplicate detection of lower layer SDUs
Retransmission of PDCP SDUs
Ciphering and deciphering
Timer-based SDU discard in a UL As described above, reordering of the NR PDCP device may mean reordering of PDCP PDUs received from a lower layer based on PDCP sequence numbers (SNs), and may include transfer of data to an upper layer in the order of reordering or immediate transfer without considering the order, or recording of lost PDCP PDUs through rearrangement, status report for the lost PDCP PDUs to a transmission side, and retransmission request for the lost PDCP PDUs.

The main functions of the NR RLC 410 or 435 include some of the following functions.

Transfer of upper layer PDUs
In-sequence delivery of higher layer PDUs
Out-of-sequence delivery of higher layer PDUs
Error correction through an ARQ
Concatenation, segmentation, and reassembly of RLC SDUs
Re-segmentation of RLC data PDUs
Reordering of RLC data PDUs
Duplicate detection
Protocol error detection
RLC SDU discard
RLC reestablishment As described above, in-sequence delivery of the NR RLC device may mean in-sequence delivery of RLC SDUs received from a lower layer to an upper layer. In case that one original RLC SDU is segmented into several RLC SDUs to be received, the in-sequence delivery of the NR RLC device may include reassembly and delivery of the RLC SDUs, reordering of the received RLC PDUs based on an RLC SN or a PDCP SN, recording of lost RLC PDUs through reordering, status report for the lost RLC PDUs to a transmission side, and retransmission request for the lost RLC PDUs. The in-sequence delivery of the NR RLC device may include in-sequence delivery of RLC SDUs just before the lost RLC SDU to an upper layer if there is the lost RLC SDU, in-sequence delivery of all RLC SDUs received before a specific timer starts its operation to an upper layer if the timer has expired although there is the lost RLC SDU, or in-sequence delivery of all RLC SDUs received up to now to an upper layer if a specific timer has expired although there is the lost RLC SDU. The NR RLC device may process the RLC PDUs in the order of their reception (in the order of arrival, regardless of the order of a serial number or sequence number), and may transfer the processed RLC PDUs to the PDCP device in an out-of-sequence delivery manner.

In case of receiving segments, the NR RLC device may receive the segments stored in a buffer or to be received later, reconfigure and process the segments as one complete RLC PDU, and then transfer the processed RLC PDU to the PDCP device. The NR RLC layer may not include a concatenation function, and the function may be performed by an NR MAC layer or may be replaced by a multiplexing function of the NR MAC layer.

As described above, the out-of-sequence delivery of the NR RLC device may mean a function of transferring the RLC SDUs received from a lower layer directly to an upper layer regardless of their order. If one original RLC SDU is segmented into several RLC SDUs to be received, the out-of-sequence delivery of the NR RLC device may include reassembly and delivery of the RLC SDUs, and functions of storing and ordering the RLC SNs or PDCP SNs of the received RLC PDUs and recording of the lost RLC PDUs.

The NR MAC 415 or 430 may be connected to several NR RLC layer devices configured in one UE, and the main functions of the NR MAC include some of the following functions.

Mapping between logical channels and transport channels
Multiplexing/demultiplexing of MAC SDUs
Scheduling information reporting
HARQ function (error correction through HARQ)
Priority handling between logical channels of one UE
Priority handling between UEs by dynamic scheduling
MBMS service identification
Transport format selection
Padding The NR PHY layer 420 or 425 may perform channel coding and modulation of upper layer data to configure and transmit OFDM symbols on a radio channel, or may perform demodulation and channel decoding of the OFDM symbols received on the radio channel to transfer the demodulated and channel-decoded symbols to an upper layer.

Figure 5:
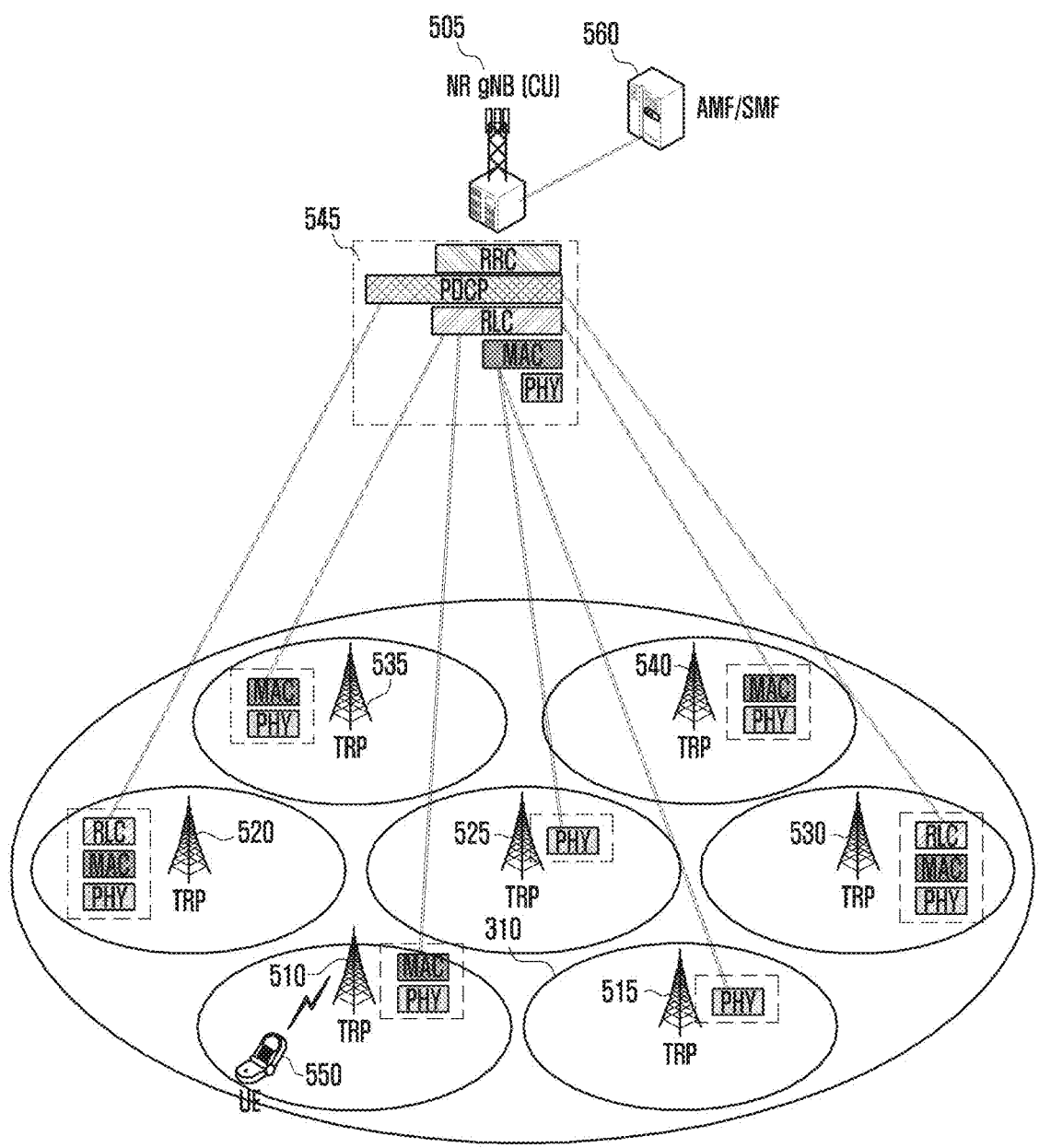
FIG. 5 illustrates the structure of another next generation mobile communication system.

FIG. 5 illustrates the structure of another next generation mobile communication system to which various embodiments are applied.

With reference to FIG. 5, a cell being serviced by an NR gNB 505 that performs a beam-based operation may be composed of several TRPs 510, 515, 520, 525, 530, 535, and 540. The TRPs 510, 515, 520, 525, 530, 535, and 540 represent blocks in which some functions of transmitting and receiving physical signals are separated from the existing NR gNB (or NR BS), and are composed of multiple antennas.

The NR gNB 505 may be expressed as a central unit (CU), and the TRP may be expressed as a distributed unit (DU). The functions of the NR gNB 505 and the TRP may be configured by separating some layers from a PDCP/RLC/MAC/PHY layer as shown in item 545. That is, the TRPs 515 and 525 may be composed of PHY layers and may perform the functions of the corresponding layers, TRPs 510, 535, and 540 may be composed of PHY layers and MAC layers and may perform the functions of the corresponding layers, and TRPs 520 and 530 may be composed of PHY layers, MAC layers, and RLC layers, and may perform the functions of the corresponding layers. In particular, the TRPs 510, 515, 520, 525, 530, 535, and 540 may use beamforming technology that transmits and receives data by generating narrow beams in various directions by using multiple transmission and reception antennas. A UE 550 accesses the NR gNB 505 and an external network through the TRPs 510, 515, 520, 525, 530, 535, and 540.

In order to provide services to users, the NR gNB 505 supports connections between the UEs and a core network (CN), particularly, an access and mobility management function (AMF)/session management function (SMF) 560, by performing scheduling by gathering state information, such as a buffer state of UEs, an available transmission power state, and a channel state.

The TRP that is used in various embodiments of the disclosure will be described by using a structure (e.g., 515 or 525) which has the PHY layer and can perform the function of the corresponding layer. However, the structure of the TRP is not limited thereto.

In various embodiments, in consideration of a case that PUSCH repetition transmission is performed by a plurality of TRPs in the form of time division multiplexing (TDM) in a state where the TRPs are configured in the next generation mobile communication system, the UE actually performs transmission on different time resources for the TRPs, and since the physical channels are different from each other, the transmission powers have different sizes. Accordingly, it may be necessary for the UE to transfer (transmit), to the BS, how much idle transmittable power is for the TRPs, and a method for supporting this this transfer is described herein.

The UE receives data through a certain DL carrier or transmits data through a certain UL carrier has the same meaning as that the UE transmits or receives data by using a control channel and/or a data channel provided by a cell corresponding to a center frequency and a frequency band characterizing the carrier. Further, for convenience in explanation, embodiments are described under the assumption of an NR system, but the various embodiments of the disclosure may also be applied to various wireless communication systems supporting CA or dual connectivity (DC).

With or without the CA, reverse (i.e., from the UE to the BS) transmission causes interference in the reverse direction of other cells, and thus the reverse transmission power should be maintained at a proper level. For this, in performing the reverse transmission, the UE calculates the reverse transmission power by using a specific function, and performs the reverse transmission with the calculated reverse transmission power. For example, the UE calculates a required reverse transmission power value by inputting scheduling information, such as an amount of allocated transmission resources and a modulation coding scheme (MCS) level to be applied, and input values for estimating a channel situation, such as a path loss value, to the specific function, and performs the reverse transmission by applying the calculated required reverse transmission power value. The reverse transmission power value that can be applied by the UE is limited by the maximum transmission value of the UE and, if the calculated required transmission power value exceeds the maximum transmission value of the UE, the UE applies the maximum transmission value to perform the reverse transmission. In this case, since sufficient reverse transmission power cannot be applied, the reverse transmission quality may deteriorate. It is preferable that the BS performs scheduling so that the required transmission power does not exceed the maximum transmission power. However, since the BS is unable to grasp parameters, such as path loss, the UE reports, as needed, the UE's own available transmission power (PH) state to the by transmitting a PHR message.

Factors affecting the available transmission power include: (1) the amount of allocated transmission resources, (2) the MCS to be applied to the reverse transmission, (3) the path loss of the associated DL carrier, and (4) the accumulated value of a power adjustment command. Among them, the path loss or the accumulated power adjustment command value may differ for each UL carrier. Thus, in case that a plurality of reverse carriers are aggregated in one UE, it is proper to configure whether to transmit the PHR for each UL carrier. However, for efficient PHR transmission, it may be possible to report all PHs for multiple reverse carriers in one reverse carrier. Depending on the operation strategy, the PH for the carrier in which the actual PUSCH transmission has not occurred may be required. Accordingly, in this case, a method for reporting all PHs for a plurality of reverse carriers in one reverse carrier may be more efficient. For this, the existing PHR should be extended. A plurality of PHs to be included in one PHR may be configured in a predetermined order.

The PHR is usually triggered when the path loss of the connected forward carrier is changed to at least a predetermined reference value, when a prohibit PHR timer expires, or when a predetermined time elapses after the PHR is generated. The UE does not immediately transmit the PHR even when the PHR is triggered, but waits until a time when reverse transmission is possible, for example, a time when a reverse transmission resource (e.g., UL grant) is allocated. This is because the PHR is not information that must processed very quickly.

Figure 6:
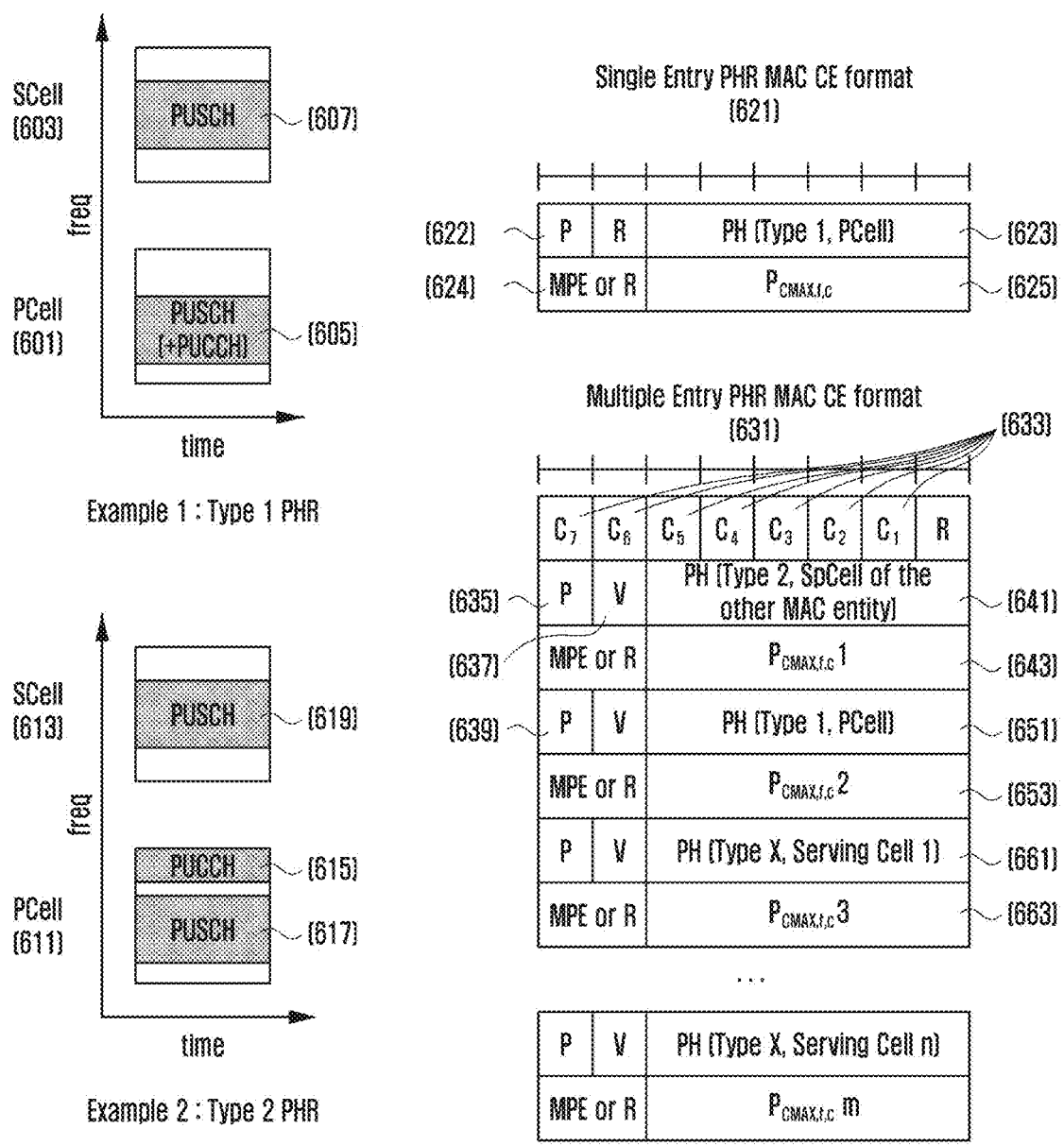
FIG. 6 illustrates an uplink (UL) transmission method in accordance with configurations and UL types to which embodiments are applicable.

FIG. 6 illustrates a UL transmission method in accordance with configurations and UL types to which embodiments are applied.

In FIG. 6, Example 1 (Type 1 PHR) illustrates a scenario that the UE receives configuration of two serving cells, that is, a PCell 601 and one SCell 603, and then performs UL transmission in accordance with the scheduling of the BS. In this scenario, the UE is unable to simultaneously transmit the above-described PUCCH and PUSCH in one serving cell due to restrictions of a transmission method and a radio frequency (RF) structure. Accordingly, the UE may transmit the PUSCH with PUCCH information embedded during the PUSCH transmission. In this case, the PUCCH information is transmitted through the PCell, or if there is no PUSCH being transmitted through the PCell, it is transmitted through the SCell with a low index for the SCell. The above-described PHR message is transmitted on a part of the PUSCH. Thus, in this scenario, the UE needs to report a PH value obtained by subtracting the transmission power consumed for PUSCH transmission 605 or 607 from the maximum transmission power ($P_{CMAX,c}$) for each serving cell. This is called Type 1 PHR.

In the same manner, Example 2 of FIG. 6 (Type 2 PHR) illustrates a scenario that the UE is configured with two servicing cells, that is, a PCell 611 and one SCell 613, and then performs UL transmission in accordance with the scheduling of the BS. In this scenario, the UE has the capability to simultaneously transmit the PUCCH and PUSCH in one serving cell, or to transmit the PUCCH and PUSCH separately by using a UL transmission technology capable of performing simultaneous transmission as described above. In this case, for the PCell (or the same for the SCell if the PUCCH transmission is possible through the SCell), it is necessary for the UE to consider the transmission wave consumed for the PUSCH transmission 617 and the PUCCH transmission 615, and report a PH value obtained by subtracting all the corresponding PUSCH and PUCCH transmission values from the maximum transmission power ($P_{CMAX,f,c}$). This is called Type 2 PHR. Also Type 2 PHR includes the transmission power consumed for PUSCH transmission 619.

When reporting the Type 1 PHR or the Type 2 PHR, the UE uses a MAC CE that is a control message of a MAC layer, and more particularly, the UE reports the PH by using a single entry PHR MAC CE format 621 or a multiple entry PHR MAC CE format 631. In case that a single carrier is used, the UE reports by using the single entry PHR format 621 and, in case that a dual connection is configured (or in case that the CA is configured), the UE reports by using the multiple entry PHR MAC CE format 631.

In case that the single entry PHR MAC CE format 621 is used, the UE (uses the single carrier), and transmits a PH 623 and the maximum transmission power $P_{CMAX,f,c}$ 625 of the corresponding serving cell with respect to the corresponding serving cell.

The PH value is used for the purpose of indicating one of several ranges, as in Table 1 below, and this indicates an available transmission power of the UE.

TABLE 1

| Reported value | Measured quantity value (dB) |
| --- | --- |
| POWER_HEADROOM_0 | PH < −32 |
| POWER_HEADROOM_1 | −32 ≤ PH < −31 |
| POWER_HEADROOM_2 | −31 ≤ PH < −30 |
| POWER_HEADROOM_3 | −30 ≤ PH < −29 |
| ... | ... |
| POWER_HEADROOM_53 | 20 ≤ PH < 21 |
| POWER_HEADROOM_54 | 21 ≤ PH < 22 |
| POWER_HEADROOM_55 | 22 ≤ PH < 24 |
| POWER_HEADROOM_56 | 24 ≤ PH < 26 |
| POWER_HEADROOM_57 | 26 ≤ PH < 28 |
| POWER_HEADROOM_58 | 28 ≤ PH < 30 |
| POWER_HEADROOM_59 | 30 ≤ PH < 32 |
| POWER_HEADROOM_60 | 32 ≤ PH < 34 |
| POWER_HEADROOM_61 | 34 ≤ PH < 36 |
| POWER_HEADROOM_62 | 36 ≤ PH < 38 |
| POWER_HEADROOM_63 | PH ≥ 38 |

The UE calculates an available transmission power by using Equation (1), below.

$$PH_{type1b,f,c}(i,j,q_d,l) = P_{CMAX,f,c}(i) - \{P_{O\_PUSCH b,f,c}(j) + 10 \log_{10}(2^\mu \cdot M^{PUSCH}_{RB,b,f,c}(i)) + \alpha_{b,f,c}(j) \cdot PL_{b,f,c}(q_d) + \Delta_{TF,b,f,c}(i) + f_{b,f,c}(i,l)\} \text{ [dB]} \quad (1)$$

In Equation (1), in case of performing PUSCH transmission at i time in serving cell c (frequency f), PH(i) is calculated by the maximum reverse transmission power $P_{CMAX,f,c}(i)$, the number of resource blocks $M^{PUSCH}_{RB,b,f,c}(i)$, power offset $\Delta_{TF,c}(i)$ derived from MCS, and path loss $PL_c$, fc(i) (accumulated TPC commands). In Equation (1), above, $PL_c$ is a path loss of the cell configured to provide the path loss with respect to serving cell c. The path loss used to determine the reverse transmission power of a certain serving cell is a path loss of the forward channel of the corresponding cell, or a path loss of the forward channel of another cell. The BS selects and notifies the UE of which of the path losses is to be used through a message of an RRC layer. If the UE uses a plurality of beams in one cell, the BS notifies the UE of which beam or reference signal is selected to perform the measurement and calculation. $f_c(i)$ is an accumulated value of a transmission power control command of serving cell c. $P_{O\_PUSCH,C}$ is a parameter on an upper layer, and is composed of a sum of cell-specific and UE-specific values. In general, $P_{O\_PUSCH,C}$ applies different values depending on the PUSCH transmission type, such as semi-persistent scheduling, dynamic scheduling, and random access response. $\alpha_c$ is a 3-bit cell-specific value provided from an upper layer, and is a weight value (i.e., as this value becomes larger, the path loss exerts more influence on the reverse transmission power) that is applied to the path loss when the reverse transmission power is calculated, so that the applicable value thereof is limited depending on the PUSCH transmission type. The j value is used to represent the type of the PUSCH. In case of j=0, it represents a semi-persistent scheduling, in case of j=1, it represents a dynamic scheduling, and in case of j=2, it represents a random access response. In Equation (1), if there is no PUSCH transmission in a specific serving cell, $M_{PUSCH}$ and $\Delta_{TF}$ may be unable to be applied to the above formula in accordance with the definition (the corresponding parameter may be excluded from Equation (1), or 0 is applied as the corresponding parameter).

Meanwhile, $P_{CMAX,f,c}$ is the UE maximum transmission power of serving cell c (frequency f), and $P_{CMAX,f,c}$ is determined between $P_{CMAX\_L,f,c}$ and $P_{CMAX\_H,f,c}$, as in Equation (2), below.

$$P_{CMAX\_L,f,c} \leq P_{CMAX,f,c} \leq P_{CMAX\_H,f,c} \text{ with}$$
$$P_{CMAX\_L,f,c} = \text{MIN}\{P_{EMAX,c} - \Delta T_{C,c}, (P_{PowerClass} - \Delta P_{PowerClass}) - \text{MAX}(\text{MAX}(MPR_c, A\text{-}MPR_c) + \Delta T_{IB,c} + \Delta T_{C,c} + \Delta T_{RxSRS}, P\text{-}MPR_c)\}$$
$$P_{CMAX\_H,f,c} = \text{MIN}\{P_{EMAX,c}, P_{PowerClass} - \Delta P_{PowerClass}\} \quad (2)$$

In the Equation (2), $P_{CMAX\_H,f,c}$ that is the maximum value of $P_{CMAX,f,c}$ is determined as the minimum value between the $P_{EMAX,c}$ value that can be directly transmitted by the BS and the value of ($P_{PowerClass} - \Delta P_{PowerClass}$) that is determined for each frequency band. Further, in Equation (2), $P_{CMAX\_L,f,c}$ that is the minimum value of $P_{CMAX,f,c}$ is determined as the value that is reduced in accordance with an additional element between the maximum values. For example, the value $\Delta T_{C,c} = 1.5$ dB can be reduced in accordance with a condition for each band from the $P_{EMAX,c}$ value, and the minimum value of the maximum transmission power of the UE can be reduced based on the largest value among the values of $P_{PowerClass} - \Delta P_{PowerClass}$ that are determined for frequency bands in consideration of the value that considers the maximum power reduction (MPRc) value determined in accordance with the transmission modulation and the transmission bandwidth of the UE and an additional maximum power reduction (A-MPRc) value (or called network signaling (NS) value) determined in accordance with the signaling that the BS additionally transmits to the UE in order to reduce interference of neighboring bands, and the power management maximum power reduction (P-MPRc) value used for the purpose of reducing the transmission power to match the required value in which the electromagnetic wave energy is absorbed by the human body. For example, in case of the system operating at high frequency like the NR system, the UE may perform the transmission at high power, and in case of the transmission at the corresponding high power, it may be harmful to the human body. Thus, it is necessary to adjust the maximum transmission value in accordance with the required value for regulating this. As described above, a case where the actual transmission power is adjusted to lower the minimum value of the maximum transmission power in accordance with the P-MPRc value is called a power backoff that occurs due to the power management.

In case of using the multiple entry PHR MAC CE format 631, the UE notifies which serving cell the UE reports the PH to with a bitmap 633, the PH is reported like 641, 651, and 661 with respect to the reported serving cell and serving cells that are unconditionally reported, and if the report is required, the UE reports the $P_{CMAX,f,c}$ values 643, 653, and 663 corresponding to this together. Meanwhile, in case of reporting the PH, the UE reports by using a field having a 6-bit length as illustrated, which has a value provided in Table 2, below. The actual transmission power values corresponding to respective PH values refer to values defined in TS 38.133, in Table 2 below (PH levels for PHR), Table 3

(nominal UE transmit power level for PHR), or Table 4 (effective power reduction for maximum permissible exposure (MPE) P-MPR).

TABLE 2

| PH | PH Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

TABLE 3

| $P_{CMAX, f, c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

TABLE 4

| MPE | Measured P-MPR value |
|---|---|
| 0 | P-MPR_00 |
| 1 | P-MPR_01 |
| 2 | P-MPR_02 |
| 3 | P-MPR_03 |

Further, in case of single/multiple entry PHR MAC CE format 621 or 631, P bit 622 or 635 and V bit 637 additionally exist.

In case of P bit 622 or 635, if the maximum transmission power value of the corresponding serving cell becomes lower than the original value because of the power backoff that occurs due to the above-described power management, the UE may report to the BS by setting the P bit 622 or 635 to 1, and thus may notify the BS that the $P_{CMAX,f,c}$ value that is reported by the UE with respect to the corresponding serving cell is the value adjusted due to the above-described reason.

In case of V bit 637, there may be a case that the UE actually transmits a UL for each serving cell and a case that the UE does not transmit the UL in accordance with the scheduling information for each serving cell at a time when the UE reports the multiple entry PHR MAC CE format 631, and in case of the actual transmission, the UE sets the V bit 637 to 0, and calculates and reports the PH value in accordance with the actual transmission, whereas in case of no transmission, the UE set the V bit 637 to 1, and reports the value calculated in a state where it is assumed that the UE has transmitted a predetermined virtual transmission as the PH. The virtual transmission is called a PUSCH reference format.

Accordingly, even if the BS uses the same PH report field for the multiple entry PHR format in accordance with the RAT and the operating frequency of the corresponding serving cell when currently reporting the PHR for the configured and activated cells to the UE, the UE generates the value by using a table according to the type of the corresponding serving cell, and reports the value to the BS.

In addition, an MPE field 624 or 639 has been introduced for the single/multiple entry PHR MAC CE. Further, each PHR format may further include a reserved (R) field.

The MPE value is an indicator representing whether the power backoff satisfies MPE constraints for FR2, and four values written in the above Table 4 may be indicated. The actual MPE value refers to TS 38.133.

Meanwhile, a condition for when to transmit the PHR to the BS (i.e., whether to trigger the report) may be defined, and the following conditions may be defined in the NR system.

Condition 1: In a state where prohibit PHR-Timer has expired, a case that a change in DL reception strength of a serving cell belonging to any MAC entity configured for the UE occurs by phr-Tx-PowerFactorChange dB or more.

That is, in the DC scenario, from the viewpoint of a master cell group (MCG), even when a signal strength change in one of the serving cells of the secondary cell group (SCG) occurs, the PHR report to the MCG is performed.

Condition 2: In case that phr-PeriodicTimer (of the corresponding MAC entity) expires.

Condition 3: In case that PHR reporting is initially configured.

Condition 4: In case that SCell including UL belonging to any MAC entity is activated.

Condition 5: In case that the primary cell (PSCell) of the SCG is added or changed when dual connectivity technology is used.

Condition 6: In case that there is a resource to be transmitted to a UL of the serving cell belonging to any MAC entity configured for the UE in a state where prohibitPHR-Timer has expired, a case that the amount of transmission power to be reduced in accordance with the power backoff occurring due to the above described power regulation is required as phr-Tx-PowerFactorChange or more as compared with the value for previously reporting the PHR MAC CE.

In accordance with the above conditions, if the PHR triggering condition occurs in each BS, the UE generates and reports a PHR to the BS. However, assuming that the above-described dynamic power sharing is not supported, if the PHR is triggered due to an event occurring in a MAC entity other than the UE's own MAC entity, the UE may not report the PH value of the serving cells belonging to the MAC entity even if reporting the PHR, and accordingly, the PHR value belonging to the UE's own MAC entity may be transmitted unnecessarily.

Figure 7:
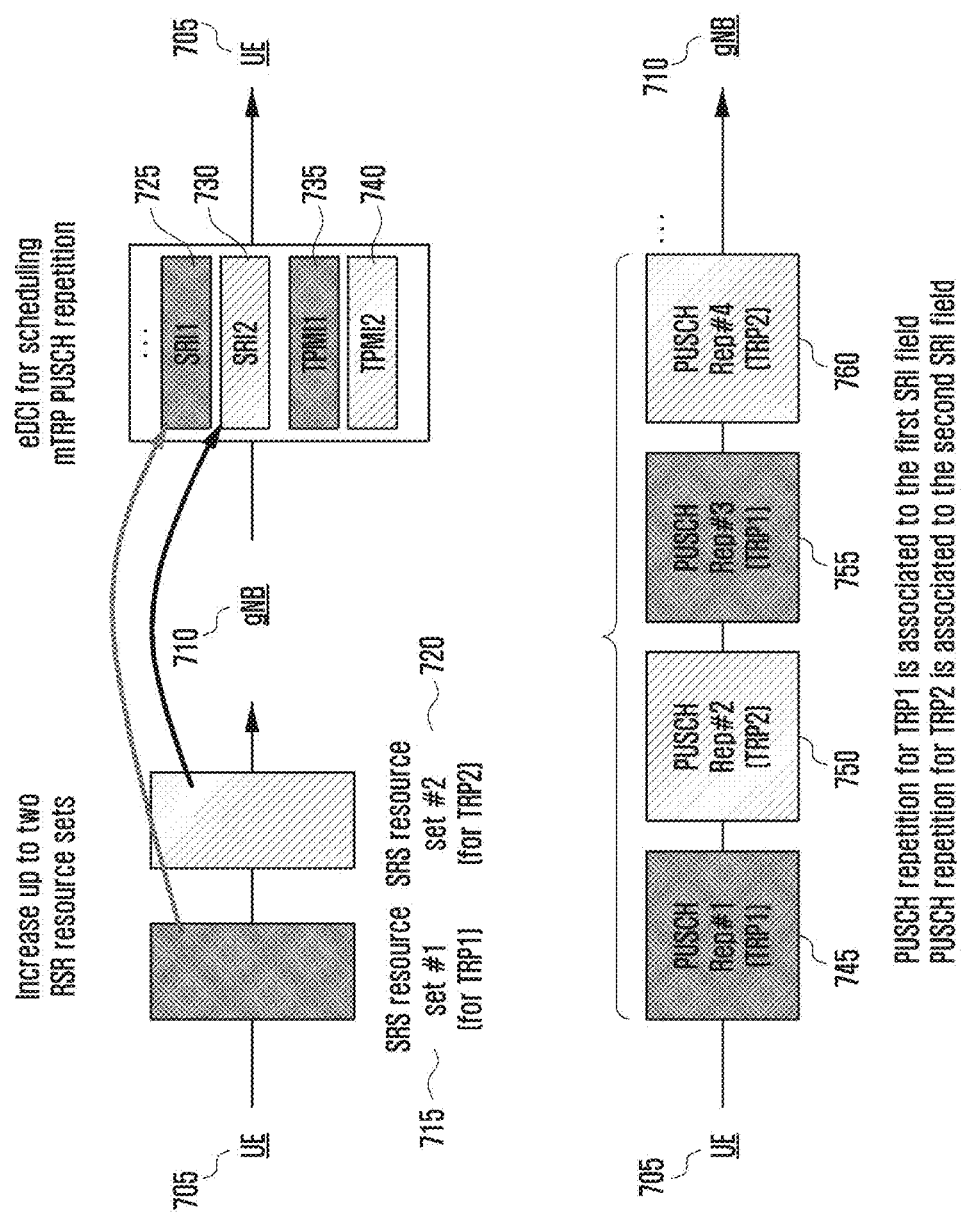
FIG. 7 is illustrates a case of supporting physical UL shared channel (PUSCH) repetition (retransmission) by utilizing a plurality of TRPs as a scenario according to embodiments.

FIG. 7 illustrates a case of supporting PUSCH repetition by utilizing a plurality of TRPs as a scenario according to embodiments of the disclosure. A UE 705 may transfer a sounding reference signal (SRS) resource in accordance with an SRS resource set configured to a BS 710. In this case, the SRS resource set is separately configured for exclusive use of TRP1 and TRP2 (715 and 720). Further, by the configuration of the BS 710, an SRS resource indicator (SRI) and a transmitted precoding matrix indicator (TPMI) may also be provided for each TRP. The BS may instruct the UE 705 to perform path loss for PUSCH transmission and PUSCH repetition for each TRP, and in this case, an enhanced DCI (eDCI) may be used. The eDCI may include at least one of SRI1 725 or for the SRS resource set 715, SRI2 730 for the SRS resource set 720, TPMI1 735 for the SRS resource set 715, or TPMI2 for the SRS resource set 720.

That is, through the above-described configurations and procedures, the UE 705 may perform PUSCH repetition of TRP1 and TRP2 through TDM. In this case, in accordance with the instructed signaling order and configuration, PUSCH repetition 745 or 755 through TRP1 and PUSCH repetition 750 or 760 through TRP2 may be performed. The order of the PUSCH repetition through the TRP1 and TRP2 has not been determined, and may differ through the configuration or signaling. However, the PUSCH repetition 745 or 755 through the TRP1 is associated with SRI1 indicated in the eDCI, and the PUSCH repetition 750 or 760 through the TRP2 is associated with SRI2 indicated in the eDCI.

Figure 8:
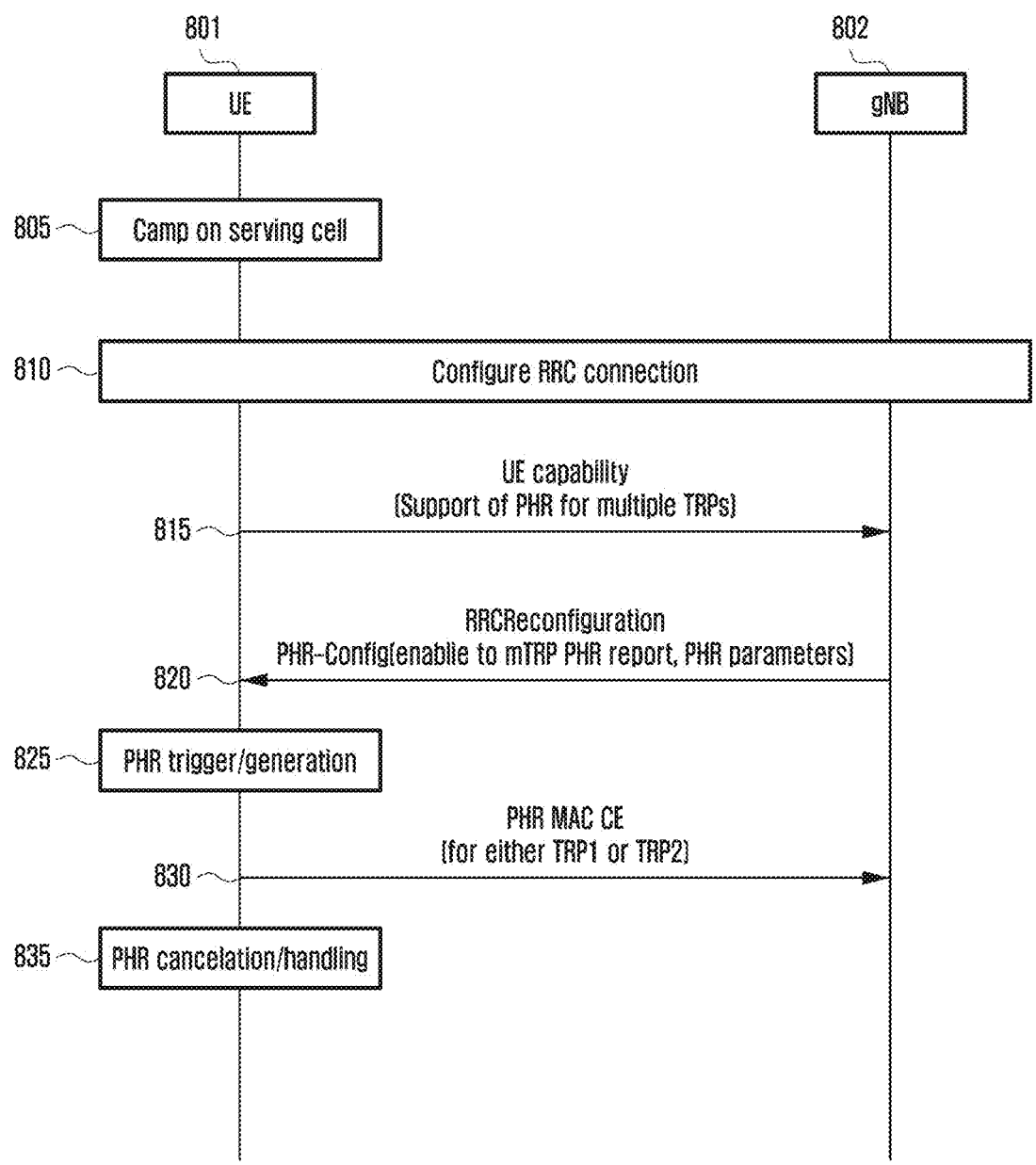
FIG. 8 illustrates an operation of performing a PHR for each TRP when PUSCH repetition through a plurality of TRPs is performed, applied to embodiments.

FIG. 8 illustrates an operation of performing a PHR for each TRP when PUSCH repetition through a plurality of TRPs is performed applied to embodiments.

The UE 801 camps on a specific BS 802 (operation 805), and at operation 810, performs connection configuration with the serving cell. At operation 815, the UE transmits UE capability to the BS. The UE capability may include capability to transfer respective PHRs to a plurality of TRPs as described in the various embodiments. The UE capability may be signaled as one indicator for each UE, or may be signaled for each band combination and each band. In addition, the UE may receive a UE capability report request from the BS and, if information indicating that the UE capability report request includes capability to transfer the respective PHRs to the plurality of TRPs is included in the UE capability report request, the UE may report the UE capability including capability to transfer the respective PHRs to the plurality of TRPs, and a method for reporting the UE capability is not limited thereto. At operation 820, the BS provides PHR related configuration together with basic RRC configuration information of the UE through the RRC configuration. RRC configuration related parameters for PHR transmission may be included in the plurality of TRPs, and the following parameters may be configured for each UE, cell/BWP, or PHR configuration.

multiTRP-PHR: Indicator for activating the PHR report in the plurality of TRPs for the UE (or an indicator for activating the PUSCH repetition may replace the role of the corresponding field)

phr-PeriodicTimer2: TRP2 dedicated periodical timer phr-ProhibitTimer2: TRP2 dedicated prohibit timer phr-Tx-PowerFactorChange2: TRP2 dedicated power change reference threshold value MPE related application or not in TRP2 and related parameter (e.g. mpe-Reporting-FR2)

At operation 825, the UE performs UL transmission according to the configuration received through the BS, and performs PHR triggering and generation while checking the PHR triggering condition. The PHR triggering conditions being considered in various embodiments are provided in Table 5, below. All conditions below are conditions in consideration of the plurality of TRPs.

Condition 1: In a state where prohibitPHR-Timer and phr-ProhibitTimer2 have expired for respective TRPs, a case that changes in DL reception strength of a serving cell belonging to any MAC entity configured for the UE occurs by phr-Tx-PowerFactorChange/phr-Tx-PowerFactorChange2 dB or more.

That is, in the DC scenario, from the viewpoint of an MCG, even when a signal strength change in one of the serving cells of the SCG occurs, the PHR report to the MCG is performed.

Condition 2: In case that phr-PeriodicTimer/phr-PeriodicTimer2 (of the corresponding MAC entity) expires.

Condition 3: In case that PHR reporting is initially configured for a plurality of TRPs. In case that an activation indication parameter is configured for TRP2 (e.g., multiTRP-PHR is configured to TRUE)

Condition 4: In case that SCell including UL belonging to any MAC entity is activated.

Condition 5: In case that the PSCell of the SCG is added or changed when dual connectivity technology is used. In case that an activation indication parameter is configured for TRP2 (e.g., multiTRP-PHR is configured to TRUE)

Condition 6: In case that there is a resource to be transmitted to a UL of the serving cell belonging to any MAC entity configured for the UE in a state where prohibitPHR-Timer has expired, a case that the amount of transmission power to be reduced in accordance with the power backoff occurring due to the above described power regulation is required as phr-Tx-PowerFactorChange/phr-Tx-PowerFactorChange2 or more as compared with the value for previously reporting the PHR MAC CE. In this case, the comparison is performed dividedly for each TRP.

TABLE 5

The path loss has changed more than phr-Tx-PowerFactorChange (or phr-Tx-PowerFactorChange2) dB (while phr-ProhibitTimer/ phr-ProhibitTimer2 is not running); or
Upon expiry of the phr-PeriodicTimer/ phr-PeriodicTimer2; or
Upon (re)configuration of the PHR functionality with enabling parameter (e.g. multiTRP-PHR); or
activation of an SCell of any MAC entity with configured addition of PSCell UL with enabling parameter with enabling parameter (e.g. multiTRP-PHR, if Cell/BWP-level handling is configured); or
The required power backoff due to power management for the serving cell has changed more than:
phr-Tx-PowerFactorChange (or phr-Tx-PowerFactorChange2) dB with enabling parameter (e.g. multiTRP-PHR, if Cell/BWP-level handling is configured).

Further, during the above procedure, the start condition of phr-PeriodicTimer is provided in Table 6, below.

The first timer (phr-PeriodicTimer) starts in case that the first UL resource for new transmission is allocated after a MAC reset is performed.

The second timer (phr-PeriodicTimer2) starts in case that the first UL resource for new transmission for TRP2 is allocated after a MAC reset is performed.

MAC entity generates PHR MAC CE, and thereafter, performs the following operations.

If the PHR MAC CE includes the PHR for the TRP1, phr-PeriodicTimer restarts.

If the PHR MAC CE includes the PHR for the TRP2, phr-PeriodicTimer2 restarts.

As replacement of the above, the MAC entity generates the PHR MAC CE as follows.

If the PHR MAC CE is the existing PHR MAC CE, phr-PeriodicTimer restarts.

If the PHR MAC CE is a new PHR MAC CE, phr-PeriodicTimer2 restarts.

TABLE 6

The first timer i.e. phr-PeriodicTimer is started when the first UL resource is allocated for a new transmission since the last MAC reset.
The second timer i.e. phr-PeriodicTimer2 is started when the first UL resource for is allocated for a new transmission for TRP 2.

TABLE 6-continued

MAC entity generates PHR MAC CE
If PHR MAC CE includes PHR for TRP 1, re-start phr-PeriodicTimer
If PHR MAC CE includes PHR for TRP 2, re-start phr-PeriodicTimer2
(Alt) MAC entity generates PHR MAC CE
If PHR MAC CE is legacy PHR MAC CE, re-start phr-PeriodicTimer
If PHR MAC CE is new PHR MAC CE, re-start phr-PeriodicTimer2

At operation 830, the UE encapsulates (adds) the generated PHR MAC CE in a MAC PDU in accordance with a grant resource, and transmits the PHR MAC CE to the BS. In the corresponding operation, the PHR MAC CE may be the existing PHR MAC CE (for TRP1) or a new PHR MAC CE (for TRP2), and may be both of them in accordance with the UL allocation resource. At operation 835, the UE cancels the pending PHR for the TRP depending on which TRP the PHR MAC has been transmitted to (or for which TRP the PHR information is included in the transmitted MAC CE). This may be a case that the PHR for the TRP is regenerated and is pending in the MAC before the PHR MAC CE is transmitted.

Figure 9:
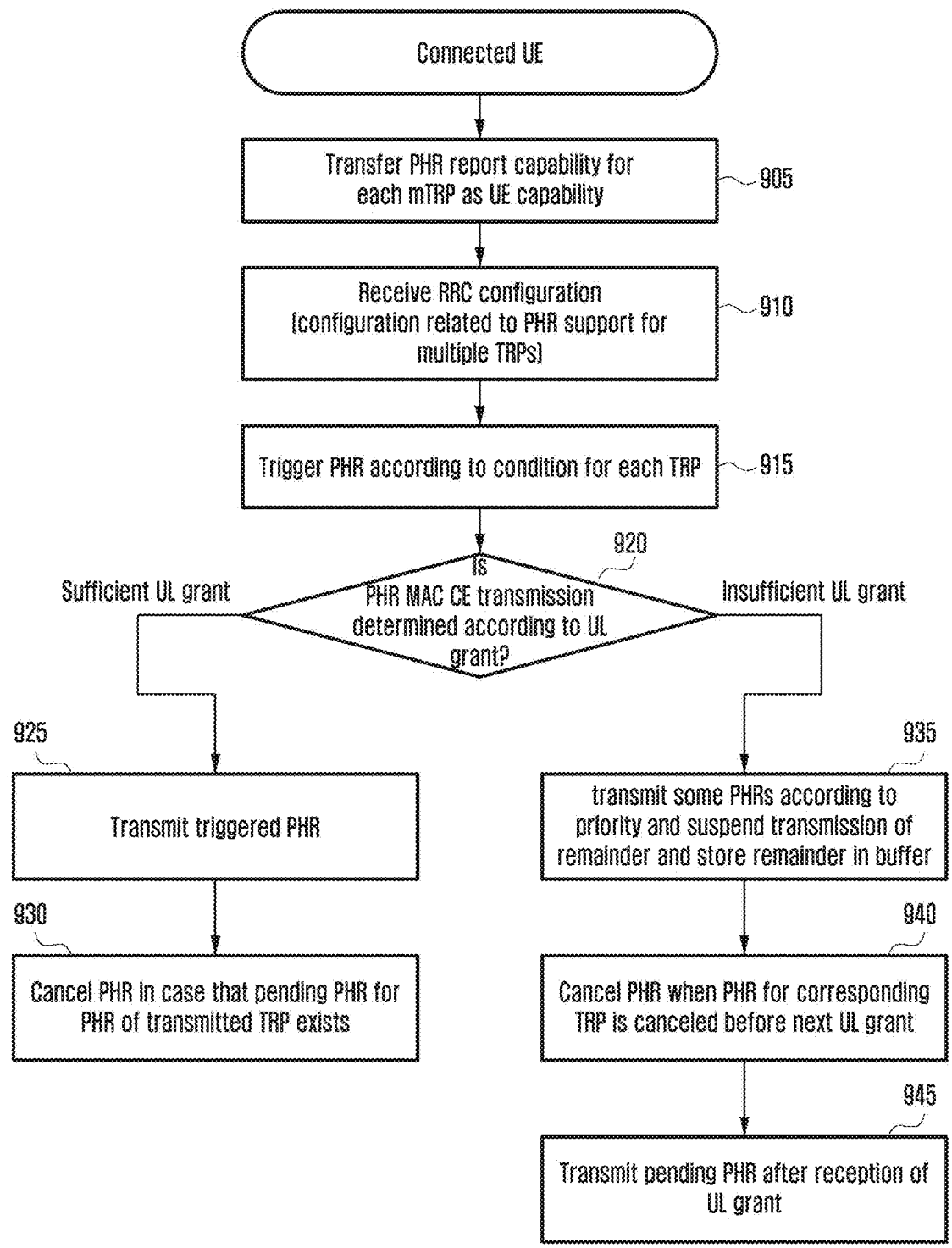
FIG. 9 illustrates a method for reporting a PHR for a plurality of TRPs as an embodiment of a UE operation that is applied to embodiments.
Figure 10A:
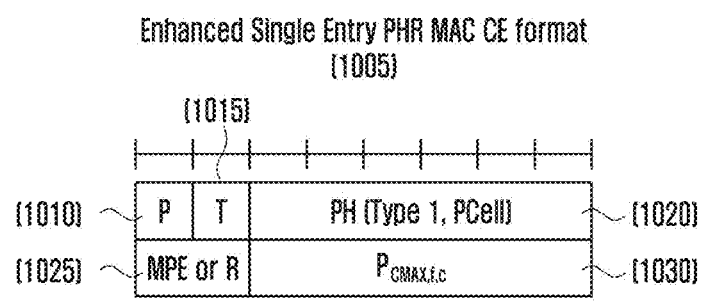
Figure 10B:
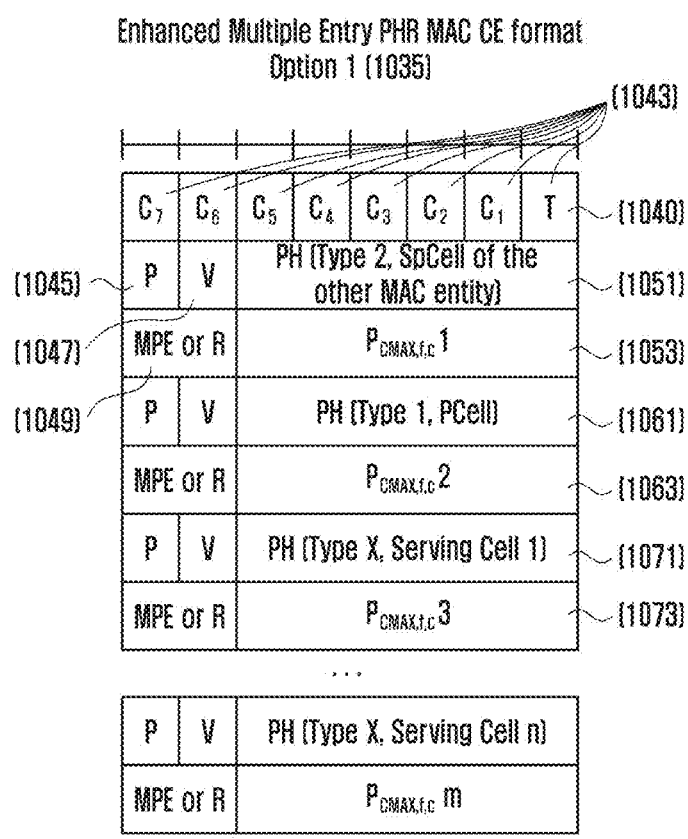
Figure 10C:
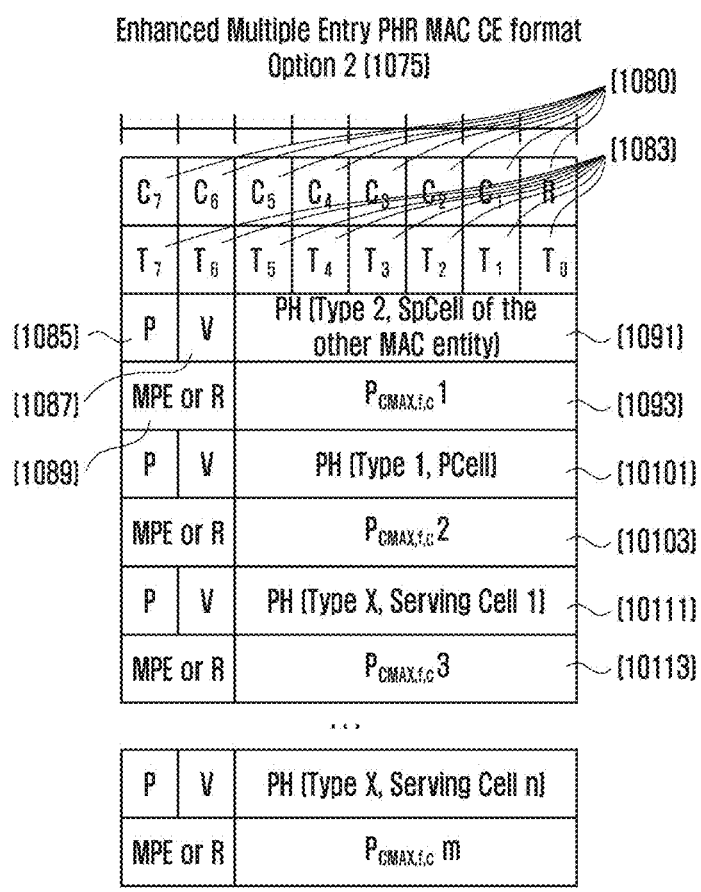

FIG. 9 illustrates a method for reporting a PHR for a plurality of TRPs as an embodiment of a UE operation that is applied to embodiments.

At operation 905, the UE in a connected state may transmit the UE capability to the BS, and the UE capability may include capability to transfer respective PHRs to a plurality of TRPs described in embodiments. The UE capability may be signaled as one indicator for each UE, or may be signaled for each band combination and each band. At operation 910, the UE receives RRC configuration from the BS, and the RRC configuration includes PHR related configuration together with basic configuration information. RRC configuration related parameters for PHR transmission may be included in a plurality of TRPs below, and the following parameters may be configured for each UE, cell/BWP, or PHR configuration.

multiTRP-PHR: Indicator for activating the PHR report in the plurality of TRPs for the UE (or an indicator for activating the PUSCH repetition may replace the role of the corresponding field)

phr-PeriodicTimer2: TRP2 dedicated periodical timer phr-ProhibitTimer2: TRP2 dedicated prohibit timer phr-Tx-PowerFactorChange2: TRP2 dedicated power change reference threshold value MPE related application or not in TRP2 and related parameter (e.g. mpe-Reporting-FR2)

At operation 915, the UE performs PHR triggering and generates the PHR MAC CE in accordance with a condition that the PHR is triggered for each TRP. The detailed condition and method for the PHR triggering refers to the operation described at operation 825 of FIG. 8. At operation 920, the UE encapsulates (adds) the generated PHR MAC CE in the UL grant received from the BS to be transmitted. In case that the UE generates and independently reports the PHR MAC CE for each TRP in the above operation, a plurality of PHR MAC CEs for TRP1 and TRP2 may be generated. In this case, it is necessary to determine for which TRP the PHR MAC CE is included. The PHR MAC CE type and a method for determining the same will be described in detail with reference to FIGS. 10A, 10B, 10C, and 10D.

In case that a UL grant sufficient to transmit the PHR MAC CEs generated at operation 920 is allocated, the UE, at operation 925, may encapsulate all of the generated PHR MAC CEs in the MAC PDU to be transmitted to the BS. If the pending PHR exists for the PHR MAC CE of the transmitted TRP, at operation 930 the UE cancels and erases this from a buffer.

Further, in case that the allocated UL grant is not sufficient to transmit the PHR MAC CEs generated at operation 920, the UE, at operation 935, may encapsulate the PHR MAC CEs among the PHR MAC CEs generated for TRPs in the MAC PDU in accordance with a predetermined priority, and may transmit the MAC PDU to the BS. At operation 940, if the pending PHR exists for the PHR MAC CE of the transmitted TRP, the UE cancels and erases this from the buffer. At operation 945, if a next UL grant is given, the UE transmits the PHR MAC CE for the TRP that remains without being transmitted to the BSs to match the UL grant.

FIGS. 10A, 10B, 10C, and 10D illustrate the structure and feature of a PHR MAC CE for a plurality of TRPs applied to embodiments of the disclosure, in various methods. Hereinafter, explanation will be made in a state where FIGS. 10A, 10B, 10C, and 10D. First, before explaining the structure of the PHR MAC CE, possible scenarios between the existing PHR and the PHR for TRP2 in various embodiments are presented, and the PHR feature for each scenario and the PHR MAC CE structure are provided.

1. Scenario 1: The UE calculates one of PHRs for TRP1 and TRP2, and generates and transmits the PHR MAC CE for the TRP.

Methods for calculating the PHR for TRP

A. Method 1: This method determines the PHR based on TRPs on an occasion that the first PUSCH repetition is performed. For example, if the first PUSCH repetition is transferred through TRP2, the PHR is calculated based on that the PHR is transferred through the TRP2.

B. Method 2: This method determines for which TRP the PHR is selected through RRC configuration.

C. Method 3: The PHR is selected and calculated always based on TRP1 (or TRP2 on the contrary) like the existing one.

Even if the PHR for another TRP is generated, the PHR MAC CE can be transferred even on an opposite channel. Further, by transferring the generated PHR MAC CE through the related TRP, it is possible to discriminate the MAC CE for which TRP depending on which TRP the MAC CE is transferred through.

MAC CE format

A. Method 1: uses the existing PHR MAC CE format as it is (refer to 621 or 631 in FIG. 6)

B. Method 2: can introduce a new PHR MAC CE including a TRP identifier (TRP Index or the like). Both a single entity 1005 and multiple entities 1035 and 1075 are supported. Detailed PHR MAC CE format is described below.

2. Scenario 2: The UE calculates all PHRs for TRP1 and TRP2, and generates and transmits the PHR MAC CE for one TRP in accordance with a specific rule.

It is necessary to determine for which TRP the PHR is selected and transmitted. That is, in case that both PHRs for TRP1 and TRP2 are simultaneously triggered, one of them is selected.

A. Method 1: This method selects the PHR for the TRP having a large PH value, and transfers the PHR MAC CE (or on the contrary, it selects the PHR for the TRP having a small PH value, and transfers the PHR MAC CE).

B. Method 2: This method selects and transfers the PHR for the first generated TRP.

C. Method 3: This method indicates one explicit TRP that requires the PHR transmission through a network (BS).

D. Method 4: This method determines in a UE implementation manner.

Even if the PHR for another TRP is generated, the PHR MAC CE can be transferred even on an opposite TRP channel. Further, by transferring the generated PHR MAC CE through the related TRP, it is possible to discriminate the MAC CE for which TRP depending on which TRP the MAC CE is transferred through.

MAC CE format

A. Method 1: This method uses the existing PHR MAC CE format as it is (refer to 621 or 631 in FIG. 6).

B. Method 2: This method can introduce a new PHR MAC CE including a TRP identifier (TRP Index or the like). Both a single entity 1005 and multiple entities 1035 and 1075 are supported. Detailed PHR MAC CE format is described below.

3. Scenario 3: The UE calculates all PHRs for TRP1 and TRP2, and generates and transmits the PHR MAC CE for all TRPs.

MAC CE format

A. Method 1: uses the existing PHR MAC CE format for TRP1 as it is (refer to 621 or 631 in FIG. 6), and for TRP2, it generates a new PHR MAC CE. In this case, the method discriminates the PHR MAC CEs by a logical channel identity (LCID) (or extended LCID (eLCID)), and the MAC CE structure may be the same as the existing structure.

B. Method 2: can introduce a new PHR MAC CE including a TRP identifier (TRP Index or the like). Both a single entity 1005 and multiple entities 1035 and 1075 are supported. Detailed PHR MAC CE format will be described hereinafter.

Although the PHR MAC CEs for TRP1 and TRP2 are calculated and independently transferred, it is necessary to determine for which TRP the PHR is first transferred in case that the allocated UL resource is insufficient. That is, priority determination is necessary.

A. Method 1: first transfers the PHR MAC CE by increasing the priority of the PHR for the TRP having a large PH value (or first transfers the PHR MAC CE by increasing the priority of the PHR for the TRP having a small PH value on the contrary).

B. Method 2: preferentially transfers the PHR for the first generated TRP.

C. Method 3: determines and indicates the priority through a network (BS).

D. Method 4: determines in a UE implementation manner.

E. Method 5: preferentially transfers the existing PHR MAC CE (or operates through fixing to an opposite case).

Even if the PHR for another TRP is generated, the PHR MAC CE can be transferred even on an opposite TRP channel. Further, by transferring the generated PHR MAC CE through the related TRP, it is possible to discriminate the MAC CE for which TRP depending on which TRP the MAC CE is transferred through.

In the above Scenarios 1, 2, and 3, "PHR MAC CE structural method 1 (refer to 621 and 631 in FIG. 6)" in which the PHR MAC CE format follows the existing structure as it is, and the PHR MAC CEs are discriminated by the LCID and the eLCID, and "new PHR MAC CE structural method 2" in consideration of TRP2 have been disclosed. Hereinafter, the "new PHR MAC CE structural method 2" is described in detail.

First, in case of the enhanced single entry PHR MAC CE 1005, a "T" field 1015 is added in comparison to the existing one, with "P" field 1010 preceding "T" field 1015. The "T" field is an identifier indicating which TRP the PHR MAC CE is for, and may indicate the TRP1 and the TRP2. As an example, if the T field is set to 0, this may be for the TRP 1, and if the T field is set to 1, this may be for the TRP2. In this case, the enhanced PHR MAC CE may be used even by changing the R bit to the T field in the existing MAC CE. That is, the existing PHR MAC CE of the same LCID can be used through modification. If not, a new additional MAC CE may be introduced and designed as described above. With respect to other fields (1020, 1025, 1030), explanation with reference to 621 of FIG. 6 may be applied as it is. A method for indicating the TRP through the T field is not limited thereto.

The enhanced multiple entry PHR MAC CE 1035 or 1075 is different from the existing one on the point that information that can discriminate the TRP is additionally included. In the present embodiment, Option 1 1035 and Option 2 1075 are disclosed.

1. Option 1: The format of the existing multiple entry PHR MAC CE follows as it is, it is notified by Ci field 1043 which serving cell the PH is reported for, and one R field may be composed of a T field 1040. It is possible to indicate a TRP identifier commonly applied to cells to which the PHs are applied. According to the structure of the multiple entry PHR MAC CE, it is featured that PH values for a plurality of SCells are included, but all the SCells are discriminated into the same TRP, and as an example, when the PHRs for TRP1 and TRP2 are triggered in a plurality of cells, it is possible to transfer the PH or PHR by grouping the same for each TRP. It may be possible to transfer the PHR MAC CE gathering PHs of cells in which the T field 1040 is 0 (i.e., for TRP1) and the PHR MAC CE gathering PHs of cells in which the T field 1040 is 1 (i.e., for TRP2) may be transferred. Further, the PHR MAC CEs gathering PHs for TRP1 and TRP2 may be concatenated and transferred (10120, refer to Option 1—variant). In this case, two T fields 10125 and 10130 indicate TRP0 (T field 0) and TRP2 (T field 1), respectively.

In this case, the enhanced PHR multiple MAC CE format 1035 may be used through configuration of the R bit in the existing MAC CE as the T field 1040. That is, the existing PHR MAC CE of the same LCID may be used through modification. If not, a new additional MAC CE may be introduced and designed as described above. With respect to other fields (1047, 1049, 1051, 1061, 1063, 1071 and 1073), explanation with reference to 631 of FIG. 6 may be applied as it is. FIG. 10D illustrates enhanced multiple entry PHR MAC CE format option 1. With respect to fields (including 10125, 10130 and other fields) of FIG. 10D, explanation of FIG. 10B may apply.

2. Option 2: The format of the existing multiple entry PHR MAC CE follows as it is, but 1 octet 1083 in the form of a TRP bitmap mapped onto a cell identifier 1080 one-on-one may be added. That is, Ci field and Ti field are mapped onto each other one-on-one, and may indicate the TRP in Ci cell. In this case, since different TRPs may be indicated with respect to cells to which PHs are reported by one PHR MAC CE, a separate additional PHR MAC CE is not necessary, and all the PHRs generated as one new PHR MAC CE may be reported. In this case, a new MAC CE structure is necessary, and the LCID or eLCID requires introduction of a new PHR MAC CE. With respect to other fields (1085, 1087, 1089, 1091, 1093, 10101, 10103, 10111 and 10113), explanation of 631 in FIG. 6 may be applied as itis.

Further, even when the number of serving cells configured for the multiple entry PHR MAC CE exceeds 8, Option 1 and Option 2 as described above can be easily extended and applied and additional explanation thereof is omitted to avoid redundancy.

Figure 11:
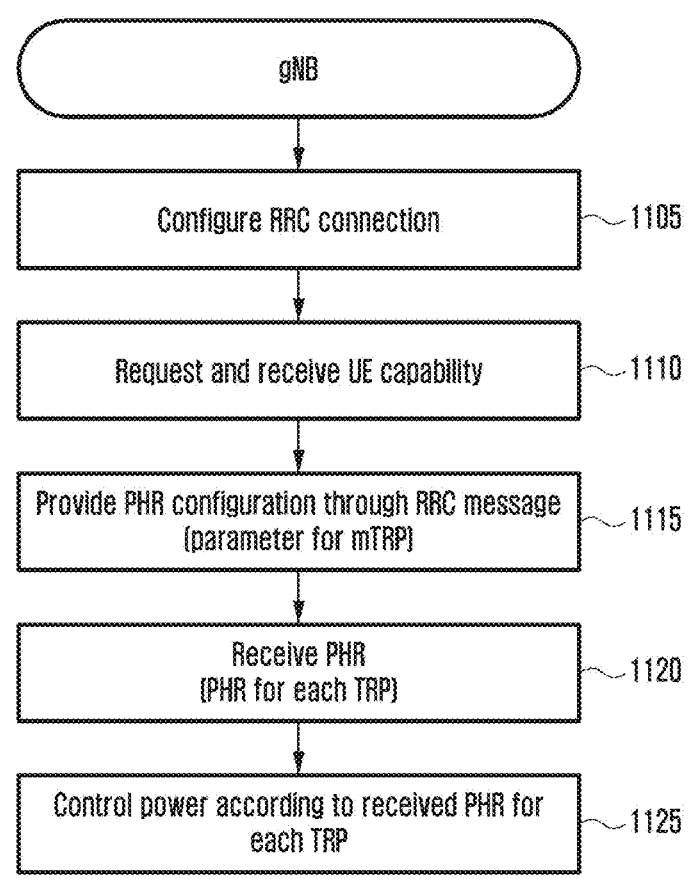
FIG. 11 illustrates an operation of a BS according to embodiments of the disclosure.

FIG. 11 illustrates an operation of a BS according to embodiments.

At operation 1105, a BS establishes a connection configuration with a UE. At operation 1110, the BS transmits a message for UE capability report request to the UE, and receives a UE capability report message from the UE. Based on the message received at operation 1110, the BS may determine whether there is a PHR MAC CE report capability for a plurality of TRPs (or PUSCH repetition capability utilizing a plurality of TRPs) in accordance with the UE capability. Thereafter, at operation 1115, the BS may provide RRC configuration information in consideration of the UE capability. In the operation, the BS may provide PUSCH repetition using the plurality of TRPs and PHR related configuration to the UE. For example, the BS may configure the above configurations to the UE by using the RRC message, which may include a parameter for mTRP. The configuration method is not limited thereto, and a method in which the configurations for PHR and mTRP configured using another message or through the RRC message are activated through the MAC CE and DCI may be considered. At operation 1120, the BS may receive the PHR MAC CE from the UE, and in this case, one or a plurality of PHR MAC CEs may be used in accordance with the scenarios and methods as described above in various embodiments of the disclosure. Through the above process, the BS may identify the PH for each TRP. At operation 1125, the BS performs power control for the UE with reference to the PHR report for the actually received TRP. The base station may identify the cell and the PH for each TRP based on the PHR received from the UE, and may perform the power control in consideration of the identified PH.

Figure 12:
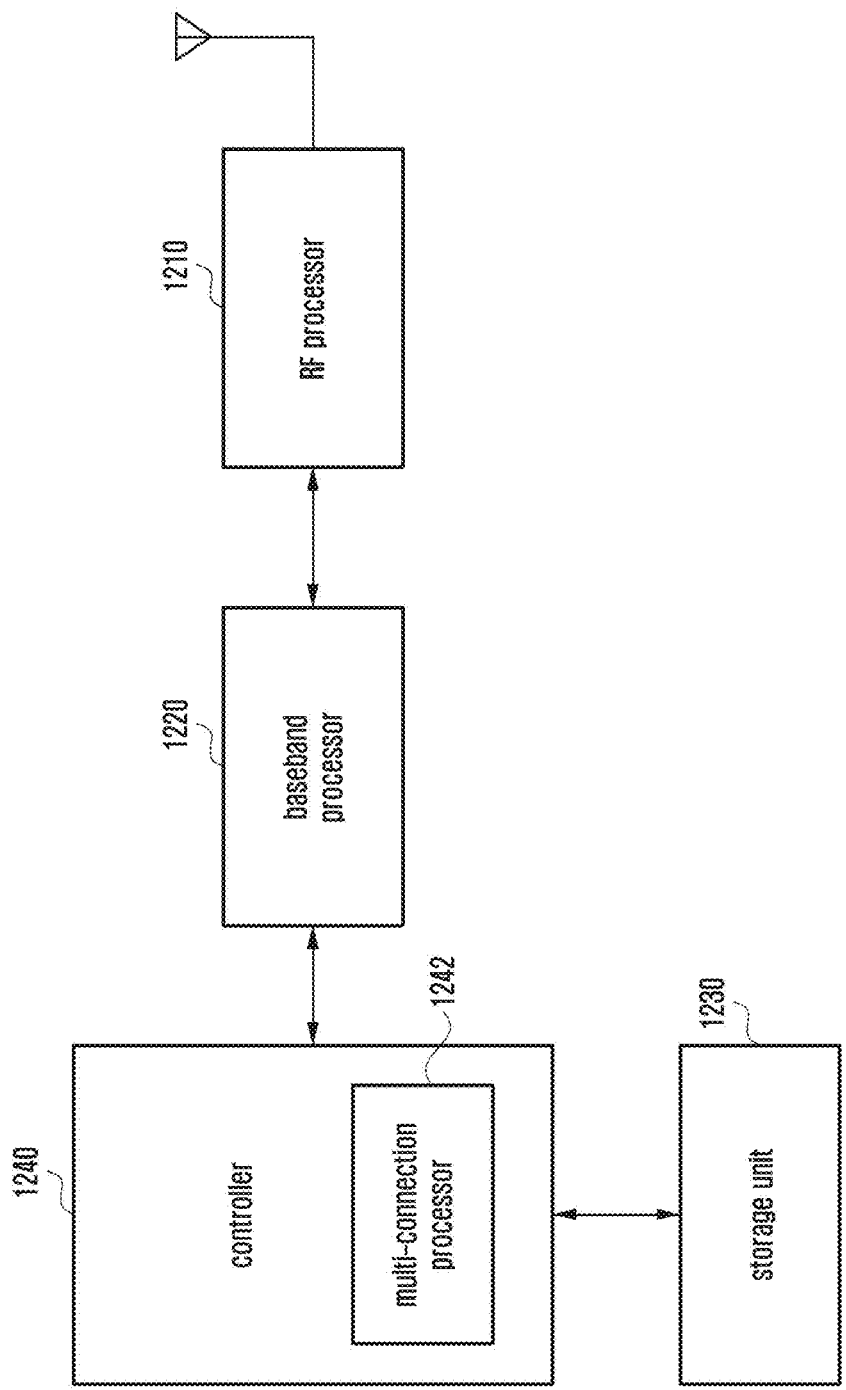
FIG. 12 illustrates the configuration of a UE according to embodiments.

FIG. 12 illustrates the configuration of a UE to which embodiments are applied.

With reference to FIG. 12, the UE includes an RF processor 1210, a baseband processor 1220, a storage unit 1230, and a controller 1240. The controller 1240 may further include a multi-connection processor 1242.

The RF processor 1210 performs a function for transmitting and receiving a signal on a radio channel, such as signal band conversion and amplification. That is, the RF processor 1210 performs up-conversion of a baseband signal provided from the baseband processor 1220 into an RF-band signal to transmit the converted signal through an antenna, and performs down-conversion of the RF-band signal received through the antenna into a baseband signal. For example, the RF processor 1210 may include a transmission filter, a reception filter, an amplifier, a mixer, an oscillator, a digital-to-analog converter (DAC), and an analog-to-digital converter (ADC). Although one antenna is illustrated, the UE may be provided with a plurality of antennas. Further, the RF processor 1210 may include a plurality of RF chains. Further, the RF processor 1210 may perform beamforming.

For the beamforming, the RF processor 1210 may adjust phases and sizes of signals transmitted or received through the plurality of antennas or antenna elements. Further, the RF processor 1210 may perform MIMO, and may receive several layers during performing of the MIMO operation.

The baseband processor 1220 performs a conversion function between a baseband signal and a bit string in accordance with the physical layer standard of the system. For example, during data transmission, the baseband processor 1220 generates complex symbols by encoding and modulating a transmitted bit string. Further, during data reception, the baseband processor 1220 restores a received bit string by demodulating and decoding the baseband signal provided from the RF processor 1210. For example, in case of following an orthogonal frequency division multiplexing (OFDM) method, during data transmission, the baseband processor 1220 generates complex symbols by encoding and modulating a transmitted bit string, performs mapping of the complex symbols onto subcarriers, and then configures OFDM symbols through the inverse fast Fourier transform (IFFT) operation and cyclic prefix insertion. Further, during data reception, the baseband processor 1220 divides the baseband signal being provided from the RF processor 1210 in the unit of OFDM symbols, restores the signals mapped onto the subcarriers through the fast Fourier transform (FFT) operation, and then restores the received bit string through demodulation and decoding.

The baseband processor 1220 and the RF processor 1210 transmit and receive the signals as described above. Accordingly, the baseband processor 1220 and the RF processor 1210 may be called a transmitter, a receiver, a transceiver, or a communication unit. Further, in order to support different radio access technologies, at least one of the baseband processor 1220 and the RF processor 1210 may include a plurality of communication modules. Further, in order to process signals of different frequency bands, at least one of the baseband processor 1220 and the RF processor 1210 may include different communication modules. For example, the different radio access technologies may include a wireless local area network (LAN) (e.g., IEEE 802.11) and a cellular network (e.g., LTE). Further, the different frequency bands may include super high frequency (SHF) (e.g., 2.NR Hz or NR Hz) band and millimeter wave (e.g., 60 GHz) band.

The storage unit 1230 stores therein a basic program for an operation of the UE, application programs, and data of configuration information. In particular, the storage unit 1230 may store information for performing PHR generation and report according to various embodiments of the disclosure. Further, the storage unit 1230 provides stored data in accordance with a request from the controller 1240.

The controller 1240 controls the overall operation of the UE. For example, the controller 1240 transmits and receives signals through the baseband processor 1220 and the RF processor 1210. Further, the controller 1240 records or reads data in or from the storage unit 1230. For this, the controller 1240 may include at least one processor. For example, the controller 1240 may include a communication processor (CP) performing a control for communication and an application processor (AP) controlling an upper layer, such as an application program. Further, the controller 1240 may control the operation of the UE according to various embodiments of the disclosure.

Figure 13:
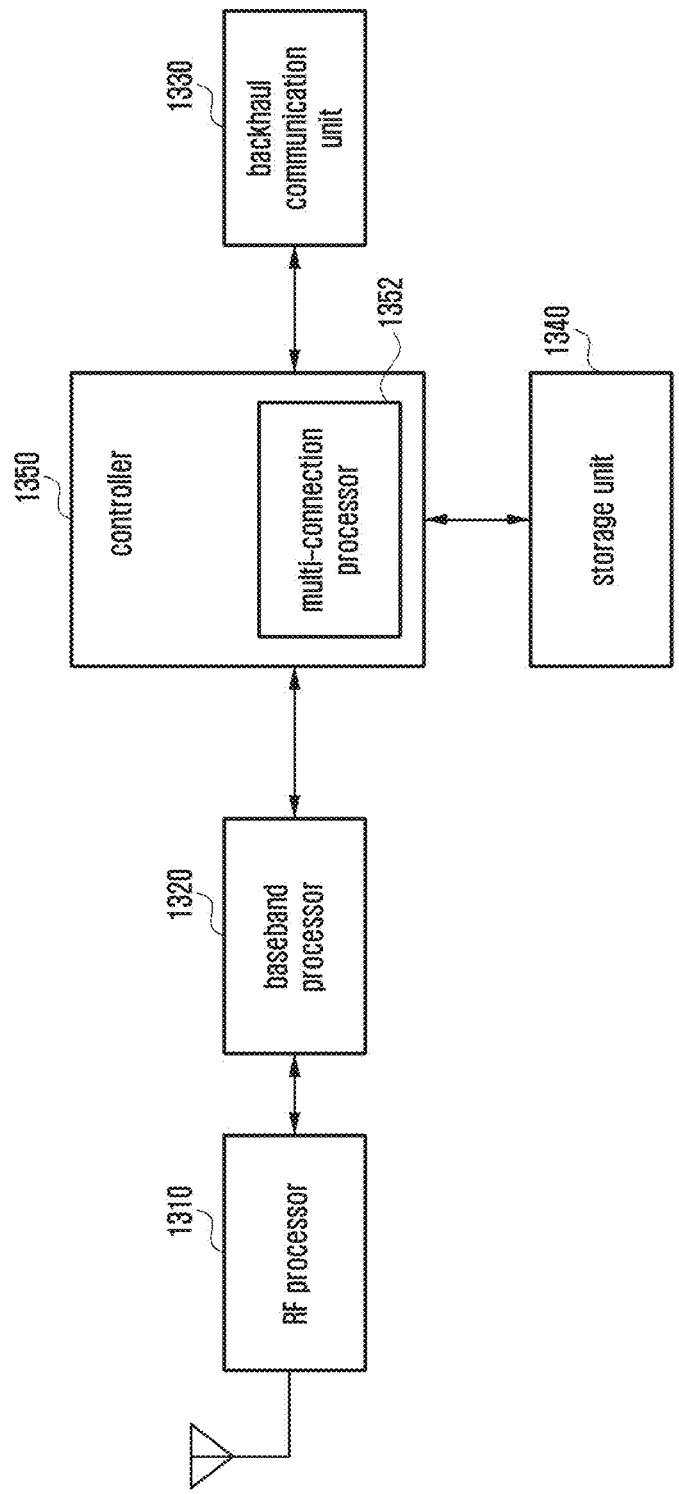
FIG. 13 illustrates the configuration of a BS according to embodiments.

FIG. 13 illustrates the configuration of an NR BS to which embodiments are applied.

As illustrated in FIG. 13, a BS is configured to include an RF processor 1310, a baseband processor 1320, a backhaul communication unit 1330, a storage unit 1340, and a controller 1350. The controller 1350 may further include a multi-connection processor 1352.

The RF processor 1310 performs a function for transmitting and receiving a signal on a radio channel, such as signal band conversion and amplification. That is, the RF processor 1310 performs up-conversion of a baseband signal provided from the baseband processor 1320 into an RF-band signal to transmit the converted signal through an antenna, and performs down-conversion of the RF-band signal received through the antenna into a baseband signal. For example, the RF processor 1310 may include a transmission filter, a reception filter, an amplifier, a mixer, an oscillator, a DAC, and an ADC. Although one antenna is illustrated, the BS may be provided with a plurality of antennas. Further, the RF processor 1310 may include a plurality of RF chains. Further, the RF processor 1310 may perform beamforming. For the beamforming, the RF processor 1310 may adjust phases and sizes of signals transmitted or received through the plurality of antennas or antenna elements. The RF processor may perform down MIMO operation through transmission of one or more layers.

The baseband processor 1320 performs a conversion function between a baseband signal and a bit string in accordance with the physical layer standard of the RAT. For example, during data transmission, the baseband processor 1320 generates complex symbols by encoding and modulating a transmitted bit string. Further, during data reception, the baseband processor 1320 restores a received bit string by demodulating and decoding the baseband signal provided from the RF processor 1310. For example, in case of following an OFDM method, during data transmission, the baseband processor 1320 generates complex symbols by encoding and modulating a transmitted bit string, performs mapping of the complex symbols to subcarriers, and then configures OFDM symbols through the IFFT operation and CP insertion. Further, during data reception, the baseband processor 1320 divides the baseband signal provided from the RF processor 1310 in the unit of OFDM symbols, restores the signals mapped to the subcarriers through the FFT operation, and then restores the received bit string through demodulation and decoding. The baseband processor 1320 and the RF processor 1310 transmit and receive the signals as described above. Accordingly, the baseband processor 1320 and the RF processor 1310 may be called a transmitter, a receiver, a transceiver, a communication unit, or a wireless communication unit.

The backhaul communication unit 1330 provides an interface for performing communication with other nodes in the network. That is, the backhaul communication unit 1330 converts a bit string being transmitted from the primary BS to other nodes, for example, an auxiliary BS and a core network, into a physical signal, and converts the physical signal being received from other nodes into a bit string.

The storage unit 1340 stores therein a basic program for an operation of the main BS, application programs, and data of configuration information. In particular, the storage unit 1340 may store information on a bearer allocated to the connected UE and the measurement result reported from the connected UE. Further, the storage unit 1340 may store information that becomes the basis of determination of whether to provide or suspend a multi-connection to the UE. Further the storage unit 1340 may store configuration for mTRP and related PHR, information for interpretation of mTRP related PHR, and programs. Also, the storage unit 1340 provides stored data in accordance with a request from the controller 1350.

The controller 1350 controls the overall operation of the main BS. For example, the controller 1350 transmits and receives signals through the baseband processor 1320 and the RF processor 1310 or through the backhaul communication unit 1330. Further, the controller 1350 records or reads data in or from the storage unit 1340. For this, the controller 1350 may include at least one processor. Further, the controller 1350 may control the operation of the BS according to embodiments.

Methods according to the claims or the embodiments described in the specification may be implemented in the form of hardware, software, or a combination of hardware and software.

In case of implementation by software, a computer readable storage medium storing one or more programs (software modules) may be provided. The one or more programs stored in the computer readable storage medium may be configured for execution by one or more processors in the electronic device. The one or more programs include instructions causing the electronic device to execute the methods according to the claims of the disclosure or the embodiments described in the specification.

Such programs (software modules or software) may be stored in a nonvolatile memory including a random access memory and a flash memory, a read only memory (ROM), an electrically erasable programmable read only memory (EEPROM), a magnetic disc storage device, a compact disc-ROM (CD-ROM), a digital versatile discs (DVDs), or other types of optical storage devices, and a magnetic cassette. Further, the programs may be stored in a memory composed of a combination of some or all of them. Further, a plurality of memories may be included in the respective configurations.

Further, the programs may be stored in an attachable storage device that can be accessible through a communication network composed of the Internet, Intranet, LAN, WLAN, or a communication network, such as a storage area network (SAN), or a communication network composed of a combination thereof. Such a storage device may be connected to a device that performs an embodiment of the disclosure through an external port. Further, a separate storage device on a communication network may be connected to the device that performs the embodiment of the disclosure.

In the above-described embodiments, the elements included in the disclosure may be expressed in the singular or plural form depending on the embodiment. However, the singular or plural expression has been selected suitably for convenience of description, and the disclosure is not limited to the singular or plural elements. Although an element has been expressed in the plural form, it may be configured in the singular form. Although an element has been expressed in the singular form, it may be configured in the plural form.

Meanwhile, the disclosed embodiments and drawings are merely to present specific examples in order to facilitate the explanation of the technical contents of the disclosure and to help understanding of the disclosure, but are not intended to limit the scope of the disclosure. That is, it will be apparent to those of ordinary skill in the art to which the disclosure pertains that other modifications based on the technical idea of the disclosure can be embodied. Further, as needed, the embodiments may be operated in combination. For example, some parts of one embodiment and another embodiment of the disclosure may be combined with each other to operate a BS and a UE. Further, the embodiments of the disclosure are applicable to other communication systems, and other modified examples based on the technical idea of the embodiments can also be embodied.

While the disclosure has been particularly shown and described with reference to certain embodiments thereof, it will be understood by those of ordinary skill in the art that various changes in form and details may be made therein without departing from the spirit and scope of the disclosure as defined by the appended claims and equivalents thereof

What is claimed is:

1. A method performed by a terminal in a wireless communication system, the method comprising:
receiving, from a base station, a radio resource control (RRC) message including information associated with a power headroom report (PHR) of multiple transmission and reception points (TRPs);
in case that a PHR is triggered, obtaining a first power headroom (PH) of a first TRP and a second PH of a second TRP based on the information indicating that the PHR of the multiple TRPs is enabled and a physical uplink shared channel (PUSCH) repetition being configured;
generating a medium access control (MAC) control element (CE) for the multiple TRPs, the MAC CE including the first PH of the first TRP and the second PH of the second TRP; and
transmitting, to the base station, the MAC CE for the multiple TRPs.

2. The method of claim 1,
wherein the first TRP is associated with a first sounding reference signal (SRS) resource set and the second TRP is associated with a second SRS resource set.

3. The method of claim 1, further comprising:
transmitting, to the base station, capability information including information indicating a support of the PHR of the multiple TRPs.

4. The method of claim 1,
wherein a type format of the first PH and a type format of the second PH are identical, and
wherein the first PH of the first TRP is associated with a cell and the second PH of the second TRP is associated with the cell.

5. A method performed by a base station in a wireless communication system, the method comprising:
transmitting, to a terminal, a radio resource control (RRC) message including information associated with a power headroom report (PHR) of multiple transmission and reception points (TRPs);
receiving, from the terminal, a medium access control (MAC) control element (CE) for the multiple TRPs based on the information indicating that the PHR of the multiple TRPs is enabled and a physical uplink shared channel (PUSCH) repetition being configured, the MAC CE including a first power headroom (PH) of a first TRP and a second PH of a second TRP; and
obtaining the first PH of the first TRP and the second PH of the second TRP based on the MAC CE for the multiple TRPs.

6. The method of claim 5,
wherein the first TRP is associated with a first sounding reference signal (SRS) resource set and the second TRP is associated with a second SRS resource set.

7. The method of claim 5, further comprising:
receiving, from the terminal, capability information including information indicating a support of the PHR of the multiple TRPs.

8. The method of claim 5,
wherein a type format of the first PH and a type format of the second PH are identical, and
wherein the first PH of the first TRP is associated with a cell and the second PH of the second TRP is associated with the cell.

9. A terminal in a wireless communication system, the terminal comprising:
a transceiver; and
a controller coupled with the transceiver and configured to:
receive, from a base station, a radio resource control (RRC) message including information associated with a power headroom report (PHR) of multiple transmission and reception points (TRPs),
in case that a PHR is triggered, obtain a first power headroom (PH) of a first TRP and a second PH of a second TRP based on the information indicating that the PHR of the multiple TRPs is enabled and a physical uplink shared channel (PUSCH) repetition being configured,
generate a medium access control (MAC) control element (CE) for the multiple TRPs, the MAC CE including the first PH of the first TRP and the second PH of the second TRP, and
transmit, to the base station, the MAC CE for the multiple TRPs.

10. The terminal of claim 9,
wherein the first TRP is associated with a first sounding reference signal (SRS) resource set and the second TRP is associated with a second SRS resource set.

11. The terminal of claim 9,
wherein the controller is further configured to transmit, to the base station, capability information including information indicating a support of the PHR of the multiple TRPs.

12. The terminal of claim 9,
wherein a type format of the first PH and a type format of the second PH are identical, and
wherein the first PH of the first TRP is associated with a cell and the second PH of the second TRP is associated with the cell.

13. A base station in a wireless communication system, the base station comprising:
a transceiver; and
a controller coupled with the transceiver and configured to:
transmit, to a terminal, a radio resource control (RRC) message including information associated with a power headroom report (PHR) of multiple transmission and reception points (TRPs),
receive, from the terminal, a medium access control (MAC) control element (CE) for the multiple TRPs based on the information indicating that the PHR of the multiple TRPs is enabled and a physical uplink shared channel (PUSCH) repetition being configured, the MAC CE including a first power headroom (PH) of a first TRP and a second PH of a second TRP, and
obtain the first PH of the first TRP and the second PH of the second TRP based on the MAC CE for the multiple TRPs.

14. The base station of claim 13,
wherein the first TRP is associated with a first sounding reference signal (SRS) resource set and the second TRP is associated with a second SRS resource set.

15. The base station of claim 13,
wherein the controller is further configured to receive, from the terminal, capability information including information indicating a support of the PHR of the multiple TRPs.

16. The base station of claim 13,
wherein a type format of the first PH and a type format of the second PH are identical, and
wherein the first PH of the first TRP is associated with a cell and the second PH of the second TRP is associated with the cell.

\* \* \* \* \*